US012675732B2

(12) United States Patent
Singh et al.

(10) Patent No.: US 12,675,732 B2
(45) Date of Patent: Jul. 7, 2026

(54) MACHINE LEARNING TECHNIQUES FOR CONTEXT-BASED DOCUMENT CLASSIFICATION

(71) Applicant: UnitedHealth Group Incorporated, Minnetonka, MN (US)

(72) Inventors: Rahul Singh, Bengaluru (IN); Rakesh P A, Bengaluru (IN); Vijaychandar Natesan, Bangalore (IN); Ramesh R. Ganesan, Bangalore (IN); Maureen E. Calkins, Hamburg, NY (US); Caroline N. Eccleston, Boise, ID (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 1016 days.

(21) Appl. No.: 17/660,940

(22) Filed: Apr. 27, 2022

(65) Prior Publication Data

US 2023/0259809 A1 Aug. 17, 2023

Related U.S. Application Data

(60) Provisional application No. 63/267,882, filed on Feb. 11, 2022.

(51) Int. Cl.
*G06N 20/00* (2019.01)
*G06F 16/93* (2019.01)

(52) U.S. Cl.
CPC ............. *G06N 20/00* (2019.01); *G06F 16/93* (2019.01)

(58) Field of Classification Search
CPC ................................ G06N 20/00; G06F 16/93
See application file for complete search history.

(56) References Cited

U.S. PATENT DOCUMENTS

| | | | |
|---|---|---|---|
| 7,558,778 B2 | 7/2009 | Carus et al. | |
| 9,607,272 B1 | 3/2017 | Yu et al. | |
| 10,339,423 B1 * | 7/2019 | Dinerstein | ............ G06F 18/214 |
| 2002/0078044 A1 | 6/2002 | Song et al. | |
| 2008/0162498 A1 | 7/2008 | Omoigui | |
| 2012/0278336 A1 * | 11/2012 | Malik | .................... G06F 40/289 707/748 |
| 2013/0332221 A1 | 12/2013 | Fay et al. | |

(Continued)

OTHER PUBLICATIONS

Rahimi et al., "Explaining Documents' Relevance to Search Queries," arXiv:2111.01314v1, published Nov. 2, 2021, 24 pgs. (Year: 2021).*

(Continued)

*Primary Examiner* — Eric J. Bycer
(74) *Attorney, Agent, or Firm* — Alston & Bird LLP

(57) ABSTRACT

Various embodiments of the present invention provide methods, apparatus, systems, computing devices, computing entities, and/or the like for performing context-based document classification prediction using a hierarchical attention-based keyword classifier machine learning framework. Certain embodiments of the present invention utilize systems, methods, and computer program products that perform context-based document classification prediction using at least one of techniques using contextual keyword classifications, techniques using attention-based keyword classifier machine learning framework, techniques using a greedy matching indicator, and/or the like.

20 Claims, 10 Drawing Sheets

600

(56) References Cited

U.S. PATENT DOCUMENTS

| | | | |
|---|---|---|---|
| 2016/0267165 A1 | 9/2016 | Wang | |
| 2018/0373779 A1 | 12/2018 | Ideses et al. | |
| 2019/0087395 A1* | 3/2019 | Priestas | G06F 40/169 |
| 2020/0090059 A1* | 3/2020 | Kim | G06Q 50/18 |
| 2020/0151591 A1 | 5/2020 | Li | |
| 2020/0265355 A1* | 8/2020 | Engineer | G06N 20/00 |
| 2022/0366139 A1* | 11/2022 | Thirumal | G06F 40/279 |

OTHER PUBLICATIONS

Liu et al., "NewsEmbed: Modeling News through Pre-trained Document Representations," arXiv:2106.00590v2, published Jun. 5, 2021, 11 pgs. (Year: 2021).*

Venturini et al., "Scaling associative classification for very large datasets," arXiv:1805.03887v1, published May 10, 2018, 24 pgs. (Year: 2018).*

Kanwal et al., "Attention-based Clinical Note Summarization," arXiv:2104.08942v2, published Oct. 1, 2021, 8 pgs. (Year: 2012).*

Zhang et. al, "HIGITCLASS: Keyword-Driven Hierarchical Classification of GitHub Repositories, " arXiv:1910.07115v2, published Nov. 13, 2021, 10 pgs. (Year: 2021).*

Shi et al., "Corpus-level and Concept-based Explanations for Interpretable Document Classification," arXiv:2004.13003v4, published on May 31, 2021, 15 pgs. (Year: 2021).*

Galassi et al., "Attention in Natural Language Processing," IEEE Transactions on Neural Networks and Learning Systems, vol. 32, No. 10, Oct. 2021, pp. 4291-4308. (Year: 2021).*

Suleiman et al., "Deep Learning Based Extractive Text Summarization: Approaches, Datasets and Evaluation Measures," 2019 Sixth International Conference on Social Networks Analysis, Management and Security, pp. 204-210. (Year: 2019).*

Ozyurt et al., "Iterative Document Retrieval via Deep Learning Approaches for Biomedical Question Answering," 2019 15th International Conference on eScience, pp. 533-538. (Year: 2019).*

Higuchi et al., "Multi-Task Learning With Cross Attention for Keyword Spotting," 2021 IEEE Automatic Speech Recognition and Understanding Workshop, pp. 571-578. (Year: 2021).*

Das, Bijoyan et al. "An Improved Text Sentiment Classification Model Using TF-IDF and Next Word Negation," arXiv preprint arXiv:1806.06407, Jun. 17, 2018, (6 pages), available online at https://arxiv.org/ftp/arxiv/papers/1806/1806.06407.pdf.

Trstenjak, Bruno et al. "KNN With TF-IDF Based Framework For Text Categorization," 24th DAAAM International Symposium On Intelligent Manufacturing and Automation, Procedia Engineering, vol. 69, Jan. 2014, pp. 1356-1364, DOI: 10.1016/j.proeng.2014.03.129.

* cited by examiner

100

Client Computing Entities 102

Predictive Document Classification Computing Entity 106

Storage Subsystem 108

Predictive Document Classification System 101

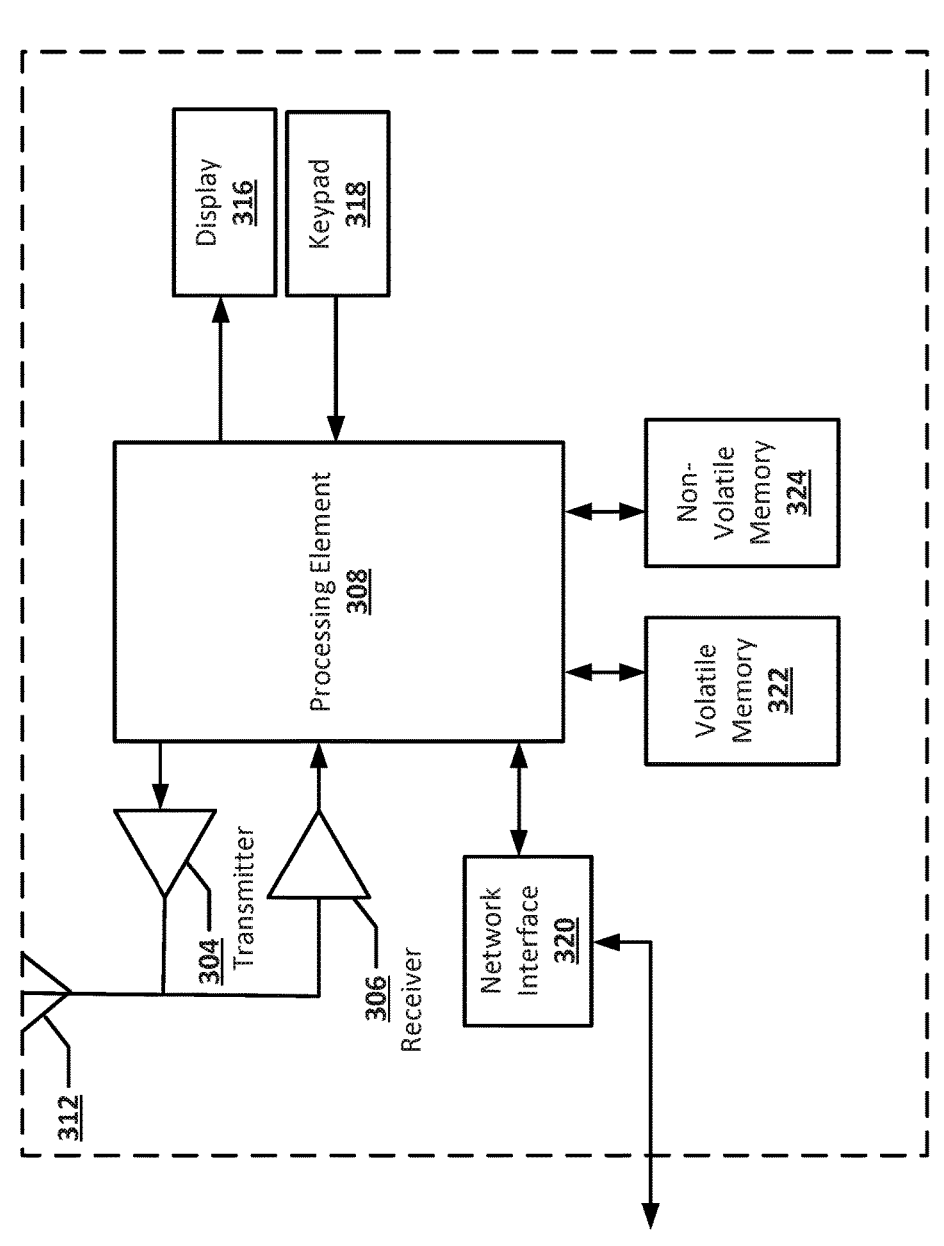
FIG. 3

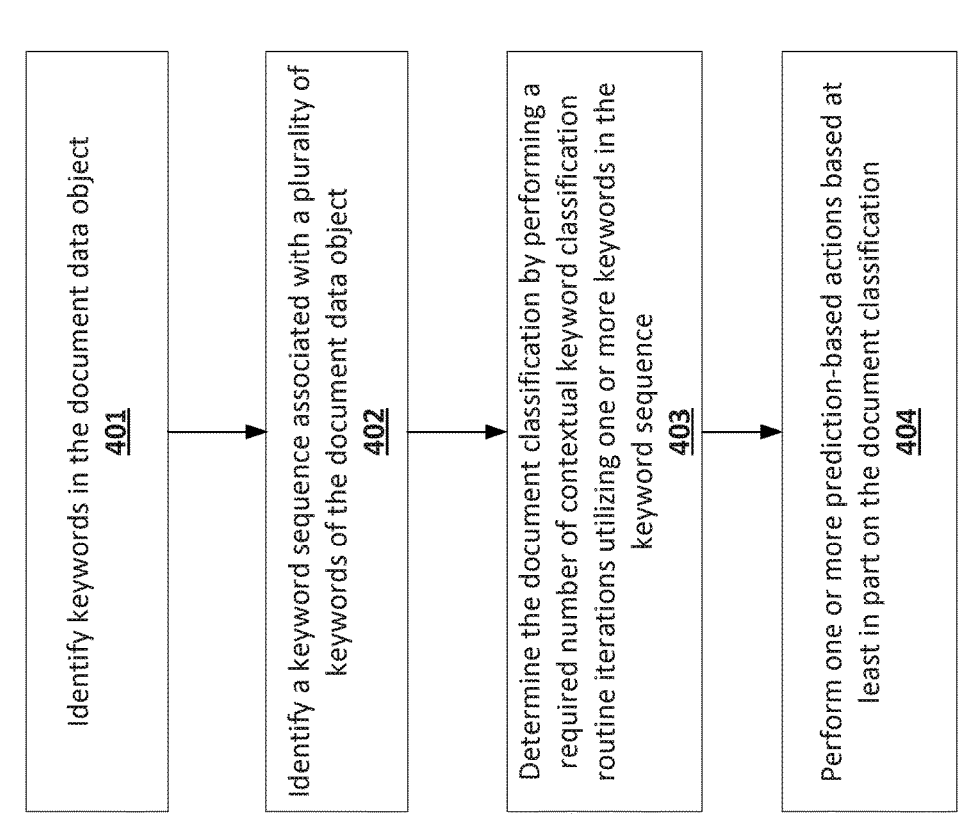

400

Identify keywords in the document data object
401

Identify a keyword sequence associated with a plurality of keywords of the document data object
402

Determine the document classification by performing a required number of contextual keyword classification routine iterations utilizing one or more keywords in the keyword sequence
403

Perform one or more prediction-based actions based at least in part on the document classification
404

FIG. 4

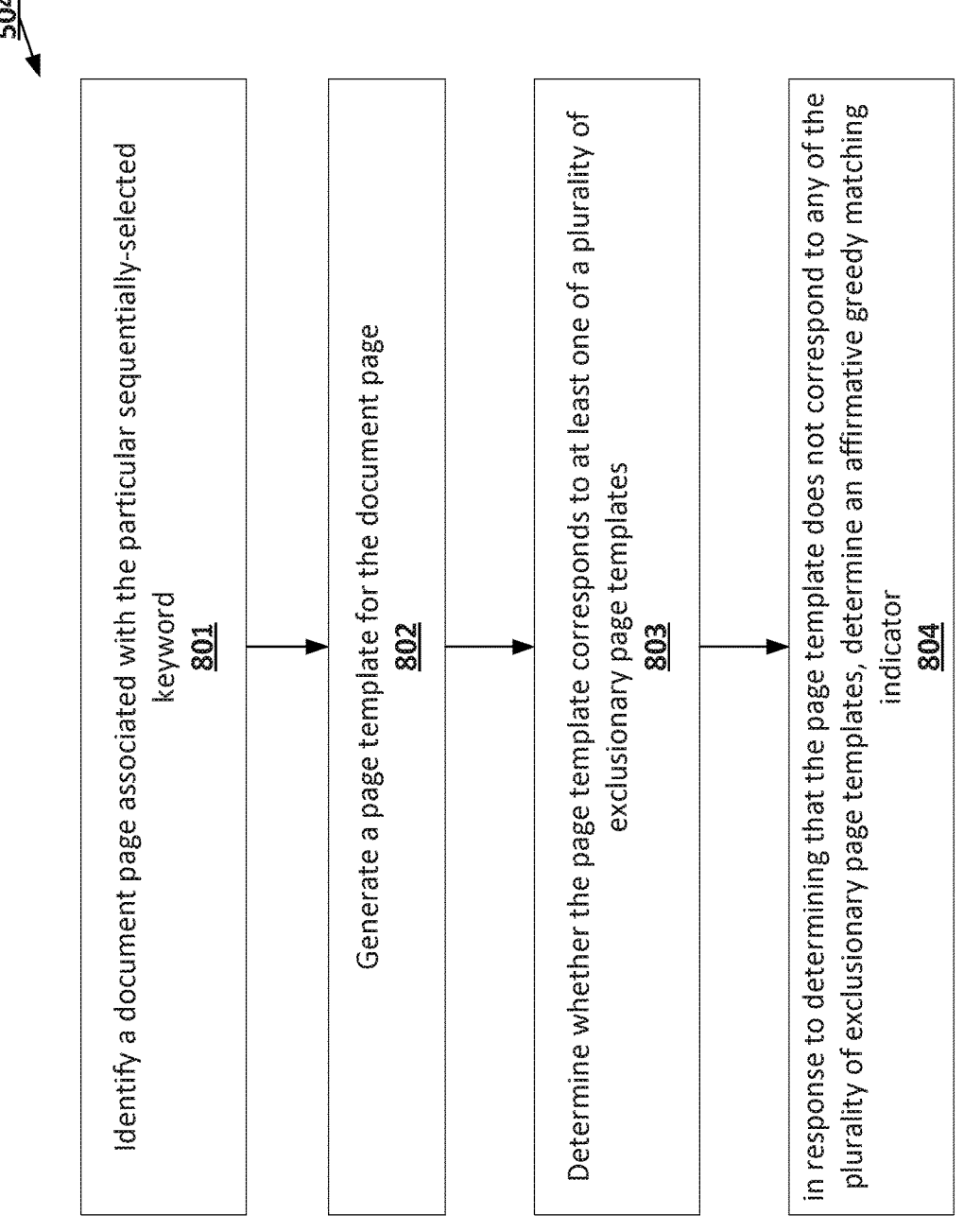

504

Identify a document page associated with the particular sequentially-selected keyword
801

Generate a page template for the document page
802

Determine whether the page template corresponds to at least one of a plurality of exclusionary page templates
803 in response to determining that the page template does not correspond to any of the plurality of exclusionary page templates, determine an affirmative greedy matching indicator
804

FIG. 8

MACHINE LEARNING TECHNIQUES FOR CONTEXT-BASED DOCUMENT CLASSIFICATION

CROSS-REFERENCE TO RELATED APPLICATIONS

This application claims the benefit of and priority to U.S. Provisional Application Ser. No. 63/267,882, filed on Feb. 11, 2022, which is incorporated by reference herein in its entirety.

BACKGROUND

Various embodiments of the present invention address technical challenges related to performing document classification prediction and disclose innovative techniques for efficiently and effectively performing context-based document classification prediction.

BRIEF SUMMARY

In general, various embodiments of the present invention provide methods, apparatus, systems, computing devices, computing entities, and/or the like for performing context-based document classification prediction. Certain embodiments of the present invention utilize systems, methods, and computer program products that perform context-based document classification prediction using at least one of techniques using contextual keyword classifications, techniques using attention-based keyword classifier machine learning framework, techniques using a greedy matching indicator, and/or the like.

In accordance with one aspect, a method is provided. In one embodiment, the method comprises: identifying a keyword sequence associated with the plurality of keywords, wherein the plurality of keywords is a subset of a keyword repository comprising a group of candidate keywords; performing a required number of contextual keyword classification routine iterations, wherein: (i) each contextual keyword classification routine iteration is associated with a corresponding sequentially-selected keyword in the keyword sequence, and (ii) each contextual keyword classification routine iteration is configured to: generate, using an attention-based keyword classifier machine learning framework and based at least in part on the corresponding sequentially-selected keyword, a contextual keyword classification, wherein: (i) the attention-based keyword classifier machine learning framework comprises an attention-based encoder machine learning model and a keyword classifier machine learning model, (ii) the attention-based encoder machine learning model is configured to generate an attention-based keyword encoding for the corresponding sequentially-selected keyword based at least in part on a defined number of context keywords of the keyword repository that occur within an attention window for the corresponding sequentially-selected keyword, and (iii) the keyword classifier machine learning model is configured to generate the contextual keyword classification for the corresponding sequentially-selected keyword based at least in part on the attention-based keyword encoding, determine a greedy matching indicator for the corresponding sequentially-selected keyword based at least in part on whether the contextual keyword classification for the corresponding sequentially-selected keyword is an affirmative contextual keyword classification, and in response to determining that the greedy matching indicator is an affirmative greedy matching indicator: (i) determine that the document data object is associated with an affirmative document classification, and (ii) terminate the required number of contextual keyword classification routine iterations; and performing one or more prediction-based actions based at least in part on the document classification.

In accordance with another aspect, a computer program product is provided. The computer program product may comprise at least one computer-readable storage medium having computer-readable program code portions stored therein, the computer-readable program code portions comprising executable portions configured to: identify a keyword sequence associated with the plurality of keywords, wherein the plurality of keywords is a subset of a keyword repository comprising a group of candidate keywords; perform a required number of contextual keyword classification routine iterations, wherein: (i) each contextual keyword classification routine iteration is associated with a corresponding sequentially-selected keyword in the keyword sequence, and (ii) each contextual keyword classification routine iteration is configured to: generate, using an attention-based keyword classifier machine learning framework and based at least in part on the corresponding sequentially-selected keyword, a contextual keyword classification, wherein: (i) the attention-based keyword classifier machine learning framework comprises an attention-based encoder machine learning model and a keyword classifier machine learning model, (ii) the attention-based encoder machine learning model is configured to generate an attention-based keyword encoding for the corresponding sequentially-selected keyword based at least in part on a defined number of context keywords of the keyword repository that occur within an attention window for the corresponding sequentially-selected keyword, and (iii) the keyword classifier machine learning model is configured to generate the contextual keyword classification for the corresponding sequentially-selected keyword based at least in part on the attention-based keyword encoding, determine a greedy matching indicator for the corresponding sequentially-selected keyword based at least in part on whether the contextual keyword classification for the corresponding sequentially-selected keyword is an affirmative contextual keyword classification, and in response to determining that the greedy matching indicator is an affirmative greedy matching indicator: (i) determine that the document data object is associated with an affirmative document classification, and (ii) terminate the required number of contextual keyword classification routine iterations; and performing one or more prediction-based actions based at least in part on the document classification.

In accordance with yet another aspect, an apparatus comprising at least one processor and at least one memory including computer program code is provided. In one embodiment, the at least one memory and the computer program code may be configured to, with the processor, cause the apparatus to: identify a keyword sequence associated with the plurality of keywords, wherein the plurality of keywords is a subset of a keyword repository comprising a group of candidate keywords; perform a required number of contextual keyword classification routine iterations, wherein: (i) each contextual keyword classification routine iteration is associated with a corresponding sequentially-selected keyword in the keyword sequence, and (ii) each contextual keyword classification routine iteration is configured to: generate, using an attention-based keyword classifier machine learning framework and based at least in part on the corresponding sequentially-selected keyword, a contextual keyword classification, wherein: (i) the attention-based keyword classifier machine learning framework comprises an attention-based encoder machine learning model and a keyword classifier machine learning model, (ii) the attention-based encoder machine learning model is configured to generate an attention-based keyword encoding for the corresponding sequentially-selected keyword based at least in part on a defined number of context keywords of the keyword repository that occur within an attention window for the corresponding sequentially-selected keyword, and (iii) the keyword classifier machine learning model is configured to generate the contextual keyword classification for the corresponding sequentially-selected keyword based at least in part on the attention-based keyword encoding, determine a greedy matching indicator for the corresponding sequentially-selected keyword based at least in part on whether the contextual keyword classification for the corresponding sequentially-selected keyword is an affirmative contextual keyword classification, and in response to determining that the greedy matching indicator is an affirmative greedy matching indicator: (i) determine that the document data object is associated with an affirmative document classification, and (ii) terminate the required number of contextual keyword classification routine iterations; and performing one or more prediction-based actions based at least in part on the document classification.

BRIEF DESCRIPTION OF THE SEVERAL VIEWS OF THE DRAWINGS

Reference will now be made to the accompanying drawings, which are not necessarily drawn to scale, and wherein:

FIG. 3 provides an example client computing entity in accordance with some embodiments discussed herein.

FIG. 4 is a flowchart diagram of an example process for performing context-based document classification prediction in accordance with some embodiments discussed herein.

FIG. 8 provides a flowchart diagram of an example process for determining a greedy matching indicator in accordance with some embodiments discussed herein.

DETAILED DESCRIPTION

Figure 1:
FIG. 1 provides an exemplary overview of an architecture that can be used to practice embodiments of the present invention.

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to context-based document classification, one of ordinary skill in the art will recognize that the disclosed concepts can be used to perform other types of classification.

I. Overview and Technical Advantages

Various embodiments of the present invention introduce techniques for improving operational reliability and computational efficiency of context-based document classification prediction by using a hierarchical attention-based keyword classifier machine learning framework. As further described herein, a hierarchical attention-based keyword classifier machine learning framework may limit real-time computational operations to those configured to generate a contextual keyword classification for one or more keywords associated with a document page of a document data object, where executing a document classification for the document data object is postponed until after executing one or more contextual keyword classification operations. In this way, by utilizing these techniques a document classification system can delay execution of some mission-critical operations to after an affirmative contextual keyword classification is determined, thus removing the number of document classification operations that need to be performed. Accordingly, by using a hierarchical attention-based keyword classifier machine learning framework, various embodiments of the present invention reduce the real-time operational load on context-based document classification solutions and thus improves operational reliability and computational efficiency of context-based document classification prediction.

Various embodiments of the present invention disclose techniques for more efficiently and reliably performing context-based document classification prediction. For example, various embodiments of the present invention disclose techniques for performing context-based document classification operations utilizing a hierarchical attention-based keyword classifier machine learning framework. For example, according to some embodiments of the present invention, context-based document classification prediction using a hierarchical attention-based keyword classifier machine learning framework can be performed by: (i) generating an attention-based keyword encoding for one or more selected keywords identified in a document page of a document data object using an attention-based encoder machine learning model of a hierarchical attention-based keyword classifier machine learning framework; (ii) generating one or more contextual keyword classifications for the one or more selected keywords based at least in part on the attention-based keyword encoding using a keyword classifier machine learning model of the hierarchical attention-based keyword classifier machine learning framework; (iii) determining a document classification based at least in part on the one or more contextual keyword classifications; and (iv) performing one or more prediction-based actions based at least in part on the document classification. Moreover, various embodiments of the present invention disclose techniques that include generating, utilizing a template classifier, a plurality of exclusionary page templates (e.g., page templates known to be associated with a negative document classification) and excluding document pages associated with a page template that corresponds to at least one of the plurality of exclusionary page templates—from indicating an affirmative document classification—so as to avoid false positives.

At least one or more of the attention-based encoder machine learning model and keyword classifier machine learning model of the hierarchical attention-based keyword classifier machine learning framework utilizes training data and prediction operations that may, in at least some embodiments, reduce or eliminate the need for computationally expensive training operations in order to generate the respective outputs, which in turn are used to perform prediction-based actions. By reducing or eliminating the noted training operations, various embodiments of the present invention: (i) reduce or eliminate the computational operations needed for training and thus improves the computational efficiency of performing context-based document classification prediction, (ii) reduce or eliminate the need for storage resources to train/generate attention-based encoder machine learning model and keyword classifier machine learning model for performing context-based document classification prediction, and thus improves storage efficiency of performing context-based document classification prediction, and (iii) reduce or eliminate the need for transmitting extensive training data needed to generate context-based document classification prediction and thus improves transmission/network efficiency of performing context-based document classification prediction. Via the noted advantages, various embodiments of the present invention make substantial technical contributions to the fields of context-based document classification prediction in particular, and healthcare-related context-based document classification prediction in general.

An exemplary application of various embodiments of the proposed invention relate to healthcare-related appeal urgency predictions for appeal cases based at least in part on corresponding case documents. Expediated keywords identified in a document page of a case document are evaluated in conjunction with context keywords associated with the expediated keywords to accurately determine/predict a document classification for the corresponding case document. In an appeal urgency prediction scenario, a large number of documents are received per year and reviewed for accurate classification, routing and case setup. Accurately identifying the urgency of an appeal case is critical since the turnaround time (TAT) for a case is typically dependent on accurate classification. For example, a standard case (e.g., Part-C standard case) for a particular case type may have a TAT of 30 days and an expedited case for the same standard case type may have a TAT of 48 hours. As another example, a standard case (e.g., Part-D standard case) for a particular case type may have a TAT of 2 days and an expedited case for the same standard case type may have a TAT of 6 hours. Moreover, standard forms with urgent/expediated keywords influence false positive urgency/expediated classification. Thus, these standard forms with urgent/expediated keywords are identified and excluded from indicating an affirmative document classification prediction.

II. Definitions of Certain Terms

The term "document data object" may refer to a data object describing a collection of text data items, image data items, and/or the like. The text data items may include structured text data, unstructured text data, and/or semi-structured text data. Examples of document data objects include Portable Document Format (PDF) files, Hyper-Text Markup Language (HTML) source files, Microsoft Word documents, image files, and/or the like. In some embodiments, a document data object is a scanned file. In some embodiments, a document data object is a computer-generated file. In some embodiments, a document data object comprises one or more document pages. In some embodiments, the document data object comprises text data as a plurality of words. In some embodiments, a variety of text tokenization methods, operations, functions, and/or techniques may be utilized to separate and/or extract individual words in text data of a document data object. In one or more embodiments, one or more words of the plurality of words of a document data object may comprise a keyword (described below). In one or more embodiments, a document data object may be classified as urgent/expediated or classified as non-urgent/non-expediated based at least in part on the one or more keywords of the document data object and associated context keywords. In some embodiments, a document page may be associated with a page template of a plurality of page templates, where a page template may describe a type/category of document page based at least in part on one or more attributes/features of the document page (e.g., heading, title, format, and/or the like).

The term "keyword" may refer to a data entity that is configured to describe a word present in a document data object that is one of a plurality of keywords that is deemed important for document classification of that document data object. In some embodiments, a keyword is deemed important for document classification for a particular document data object based at least in part on the classification type associated with the particular document data object of a plurality of classification types. For example, different keywords may be deemed important for document classification based at least in part on the classification type. For example, in an appeal urgency prediction scenario, a classification type may correspond to one or more healthcare plan types, where each healthcare plan type may be associated with different keywords that are deemed important for document classification for the corresponding healthcare plan type. In some embodiments, one or more keyword repositories comprising a collection of candidate keywords deemed important for document classification with respect to the classification types is maintained. In some embodiments, a document data object may comprise a plurality of keywords, where the plurality of keywords is a subset of a keyword repository associated with a classification type associated with the document data object. For example, in an appeal urgency prediction scenario, a keyword may describe an urgent and/or expediated keyword, such as "urgent," "expediate," "cancer," and/or the like that may be present in a document data object and may indicate that the associated appeals case is an urgent/expediated case. In various embodiments, these urgent/expediated keywords may be utilized to accurately determine a document classification for the document data object (e.g., urgent/expediate classification or non-urgent/non-expediate classification) so as to determine if the associated appeals case is truly an urgent/expediated case. In some embodiments, each keyword of document data object is associated with a document page of the one or more document pages of the document data object. For example, one or more document pages of a document data object may comprise one or more keywords.

The term "keyword repository" may refer to a data construct that describes a collection of candidate keywords for document classification for a document data object associated with a particular classification type of a plurality of classification types. Each classification type of the plurality of classification types may be associated with a particular keyword repository. In various embodiments, the keywords and context keywords utilized in determining a contextual keyword classification, which may in turn be used to determine a document classification for the corresponding document data object, may be identified based at least in part on the collection of keywords and collection of context keywords in the keyword repository for the classification type associated with the corresponding document data object, where the keywords and context keywords in the keyword repository are deemed important for document classification for the corresponding classification type. For example, identified keywords in a document page of a document data object may be a subset of keywords in the keyword repository associated with the classification type associated with the document data object. As another example, the identified context keywords for a selected keyword may be a subset of context keywords in the keyword repository associated with the classification type associated with the document data object.

The term "document classification" may refer to a data entity that is configured to describe a classification for a document data object utilizing an attention-based keyword classifier machine learning framework comprising an attention-based encoder machine learning model and a keyword classifier machine learning model. For example, in an appeal urgency prediction scenario, a document classification describes whether a particular data object is associated with an urgent/expediated classification or a non-urgent/non-expediated classification. In some embodiments, a document classification for a document data object is determined, utilizing the attention-based keyword classifier machine learning framework to generate for each selected keyword from the document data object a contextual keyword classification for the corresponding selected keyword. In various embodiments, one or more of the selected keywords is in turn used to determine a document classification for the document data object based at least in part on the contextual keyword classification for the corresponding selected keyword and whether the document page associated with the selected keyword (e.g., the document page comprising the selected keyword) corresponds to at least one exclusionary page template of a plurality of exclusionary page templates.

The term "contextual keyword classification" may refer to a data entity that is configured to describe the output of a keyword classifier machine learning model (e.g., artificial neural network machine learning model, or the like) based at least in part on an attention-based keyword encoding of a selected keyword from a document page of a document data object, where the contextual keyword classification is used to determine a document classification for the document data object. For example, in some embodiments a document page associated with a selected keyword that is determined to be associated with an affirmative contextual keyword classification (e.g., urgent/expediated classification) may be evaluated to determine the document classification for the document data object based at least in part on whether the document page corresponds to at least one exclusionary page template of a plurality of exclusionary page templates. For example, in an appeal urgency prediction scenario, an affirmative contextual keyword classification for a selected keyword may describe that the document page associated with the selected keyword indicates an urgent/expediated appeals case subject to further evaluation, as the document page may be a standard template that is excluded from conclusively indicating an urgent/expediated appeals case. In various embodiments each contextual keyword classification is associated with a contextual keyword classification routine iteration, where the number of contextual keyword classification routine iterations is based at least in part on the contextual keyword classification of selected keywords.

The term "contextual keyword classification routine" may refer to a data construct that is configured to describe a computer-implemented process that is configured to perform the following operations in order to determine a document classification for a document data object: (i) generate, using an attention-based keyword classifier machine learning framework and based at least in part on a selected keyword (e.g., sequentially-selected keyword in a keyword sequence), a contextual keyword classification for the selected keyword; (ii) determine, if the selected keyword is determined to be associated with an affirmative contextual keyword classification, whether the document page associated with the selected keyword corresponds to an exclusionary page template; and (iii) determine that the document data object is associated with an affirmative document classification (e.g., urgent/expediated classification) if it is determined that the document page does not correspond to an exclusionary page template. In one or more embodiments, a required number of contextual keyword classification routine iterations may be performed with respect to a document data object based at least in part on the output of a current contextual keyword classification routine iteration. For example, in some embodiments, each contextual keyword classification routine iteration is associated with a sequentially-selected keyword. For example, in one or more embodiments, the first iteration of a contextual keyword classification routine is performed using the first keyword in the keyword sequence associated with a plurality of keywords of the document data object. For example, in exemplary embodiments, N iterations of a contextual keyword classification routine may be performed, where the first iteration of the contextual keyword classification routine is performed using the first keyword in the keyword sequence. Additionally, one or more subsequent iterations may be performed, where each subsequent iteration is performed using the next keyword in the keyword sequence. As another example, in some embodiments, the first iteration of the contextual keyword classification routine may be performed using the last keyword in the keyword sequence and keywords for subsequent iterations may be sequentially selected in descending order.

The term "keyword sequence" may refer to a data object that describes a sequence of keywords of a plurality of keywords present in a document data object, where the sequence defines an order value for each keyword in the keyword sequence. In various embodiments, a keyword sequence is associated with a document page of a document data object, where a plurality of keyword sequences may be identified, with each keyword sequence associated with a particular document page of the corresponding document data object. For example, a keyword sequence may describe the order in which each keyword of the plurality of keywords of a keyword sequence associated with a document page of a document data object appears in the document page. For example, if a particular document page includes keywords W1 and W2, and W1 appears before W2, then the keyword sequence for the particular document page may describe that W1 has a lower order value relative to W2. For example, consider a particular document page of a document data object that includes the phrase, "Pt takes care of his wife with early Alzheimer D. Pt's daughter, 64, with late stage of pancreas cancer in N. Jersey," and consider that "care," "Alzheimer," and "cancer" are keywords. In the noted example, a keyword sequence may comprise {care, Alzheimer, cancer}, where care has a lower order value (e.g., 1) relative to Alzheimer and cancer, and Alzheimer has a lower order value (e.g., 2) relative to cancer.

The term "required number of contextual keyword classification routine iterations" may refer to a data entity that is configured to describe a number of contextual keyword classification routine iterations performed with respect to a given document data object to determine a document classification for the document data object, where each contextual keyword classification routine iteration is associated with a selected keyword (e.g., sequentially-selected keyword), and where the number of contextual keyword classification routine iterations performed is based at least in part on the output of a current contextual keyword classification routine iteration. For example, in one or more embodiments, one or more iterations of a contextual keyword classification routine is performed utilizing a sequentially-selected keyword for each iteration until a first affirmative contextual keyword classification is determined or until all keywords present in the document data object have been exhausted (e.g. utilized in performing a contextual keyword classification routine iteration).

The term "attention-based keyword classifier machine learning framework" describes a data construct that describes a hierarchical machine learning framework that comprises an attention-based encoder machine learning model configured to generate an attention-based keyword encoding for a selected keyword extracted from a document data object and a keyword classifier machine learning model configured to generate a contextual keyword classification for the corresponding selected keyword based at least in part on the attention-based keyword encoding. In one or more embodiments, the output of the attention-based encoder machine learning model is configured to be input to the keyword classifier machine learning model.

The term "attention-based encoder machine learning model" may refer to a data construct that is configured to describe parameters, hyper parameters, and/or defined operations of a machine learning model that is configured to generate an attention-based keyword encoding for a keyword identified and/or extracted from a document data object, based at least in part on a defined number of context keywords of a keyword repository that occur within an attention window for the keyword, where the keyword may be a sequentially-selected keyword in a keyword sequence associated with a plurality of keywords of the document data object. For example, in some embodiments, an attention-based encoder machine learning model is configured to process and/or evaluate the defined number of context keywords that occur within an attention window of the selected keyword in order to generate an attention weight for each context keyword, which in turn are used to generate the attention-based keyword encoding for the corresponding keyword.

In some embodiments, the attention-based encoder machine learning model may be configured to perform operations corresponding to a bidirectional self-attention mechanism. For example, in some embodiments, the attention-based encoder machine learning model may generate embeddings for the selected keyword and each context keyword associated with the selected keyword. For example, each embedding may comprise (e.g., summarize) information occurring both before and after (e.g., in a bidirectional manner) each corresponding context keyword and keyword, thereby incorporating contextual information. The embeddings may be processed and/or evaluated by a self-attention mechanism associated with the attention-based encoder machine learning model to generate attention weights for each context keyword embedding using a set of weight matrices. In some embodiments, the attention-based encoder machine learning model may utilize a multi-head self-attention mechanism comprising N attention heads, where each attention head is configured to generate a per-head set of weight matrices that is configured to be utilized in generating the attention-based keyword encoding. For example, the attention-based keyword encoding may be generated based at least in part on each per-head attention-based keyword encoding generated by each attention head, where generating the attention-based keyword encoding may comprise concatenating each per-head attention-based keyword encoding. In some embodiments, an attention-based encoder machine learning model is a trained supervised model.

The term "attention-based keyword encoding" refers to a data construct that describes the output of an attention-based encoder machine learning model for a particular selected keyword of a plurality of keywords of a document data object, where the particular selected keyword is provided as input to the attention-based encoder machine learning model. In some embodiments, an attention-based keyword encoding for a particular keyword is generated based at least in part on the defined number of context keywords within an attention window of the particular keyword. In some embodiments, the attention-based keyword encoding may be represented as a continuous vector that incorporates the inferred attention weights for each context keywords. In some embodiments, the attention-based keyword encoding is input to a keyword classifier machine learning model The term "attention window" describes a data construct that describes a defined window within a particular keyword (e.g., sequentially-selected keyword) identified in a document page of a document data object. An attention window for a particular keyword may comprise one or more context keywords in a keyword repository (described below), which are used to determine a contextual keyword classification for the particular keyword. In one or more embodiments, an attention window may describe a defined number of words before and/or after a given keyword. For example, an attention window may describe three words before the particular keyword and three words after the particular keyword, where one or more of the three words before the particular keyword and the three words after the particular keyword may comprise context keywords. As another example, an attention window may describe six words after the particular keyword, where one or more of the six words after the particular keyword may comprise context keywords. As yet another example, an attention window may describe five words before the particular keyword, where one or more of the five words before the particular keyword may comprise context keywords. As a further example, an attention window may describe three words before the particular keyword and four words after the particular keyword, where one or more of the three words before the particular keyword and the four words after the particular keyword may comprise context keywords.

The term "keyword classifier machine learning model" may refer to a data construct that is configured to describe parameters, hyper-parameters, and/or defined operations of a machine learning model that is configured to determine based at least in part on an attention-based keyword encoding of a selected keyword (e.g., sequentially-selected keyword) identified in a document page of a document data object, a contextual keyword classification for the selected keyword. In some embodiments, a contextual keyword classification for a selected keyword identified in a document page of a corresponding document data object may describe an intermediate classification associated with a contextual keyword classification routine iteration, where the interim classification (contextual keyword classification) describes that the selected keyword and/or document page is associated with an urgent/expediated or non-urgent/non-expediated classification, where the document page is subject to further evaluation to determine a document classification for the corresponding document data object. In some embodiments, the input to a keyword classifier machine learning model is an attention-based keyword encoding of the selected keyword and the output of the keyword classifier machine learning model is a vector, where the vector may comprise: (i) a confidence level value (e.g., confidence score) with respect to classification of the corresponding keyword as an affirmative contextual keyword classification (e.g., urgent/expediated classification) and/or (ii) a confidence level value (e.g., confidence score) with respect to classification of the corresponding keyword as a negative contextual keyword classification (e.g., non-urgent/non-expediated classification). In some embodiments, the keyword classifier machine learning model is an artificial neural network.

The term "greedy matching indicator" describes a data entity that is that is configured to at least in part determine when to terminate the required number of contextual keyword classification routine iterations. In various embodiments, a greedy matching indicator is determined based at least in part on whether a corresponding contextual keyword classification for a selected keyword identified in a document page of a document data object is an affirmative contextual keyword classification. In various embodiments, determining a greedy matching indicator comprises determining whether the page template for the corresponding document page corresponds to at least one of a plurality of exclusionary page templates of a plurality of exclusionary page templates.

The term "exclusionary page template" refers to a data object that describes a standard document page template that is known to be associated with a negative document classification based at least in part on historical data/information, although the standard document page template may comprise one or more keywords. For example, in an appeal urgency prediction scenario, an exclusionary page template may describe a standard healthcare form/template that comprises one or more keywords but is known to be associated with a non-urgent/non-expediated classification based at least in part on historical data/information.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS)(e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray® disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Smartmedia® cards, CompactFlash™ (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), RAMBUS® dynamic random access memory (RDRAM), Twin Transistor RAM (TTRAM), Thyristor RAM (T-RAM™), Zero-capacitor (Z-RAM), Rambus® in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example system architecture 100 for performing context-based document classification prediction. The system architecture 100 includes a predictive document classification system 101 configured to receive document classification prediction requests from a computing entity (e.g., client computing entities 102), process the document classification prediction request, provide the generated document classification prediction to the computing entity (e.g., client computing entities 102), and perform prediction-based actions based at least in part on the generated document classification prediction.

An example of a prediction-based action that can be performed using the predictive document classification system 101 is a request for determining the urgency classification for case documents corresponding to healthcare-related appeal/grievance cases. In an appeal urgency prediction scenario, a large number of documents are received per year and reviewed for accurate classification, routing and case setup. Accurately identifying the urgency of an appeal case is critical since the TAT for a case is typically dependent on accurate classification. For example, a standard case for a particular case type may have a TAT of 30 days and an expedited case for the same case type may have a TAT of 48 hours. Moreover, standard forms with urgent/expedited keywords influence false positive urgency/expediated classification.

In some embodiments, the predictive document classification system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The predictive document classification system 101 may include a predictive document classification computing entity 106 and a storage subsystem 108. The predictive document classification computing entity 106 may be configured to receive document classification prediction requests from one or more client computing entities 102, process the document classification prediction requests to generate document classification predictions corresponding to the document classification prediction requests, provide the generated document classification predictions to the client computing entities 102, and perform prediction-based actions based at least in part on the generated document classification predictions. The storage subsystem 108 may be configured to store input data used by the predictive document classification computing entity 106 to perform document classification predictions as well as model definition data used by the predictive document classification computing entity 106 to perform various document classification prediction tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Document Classification Computing Entity

Figure 2:
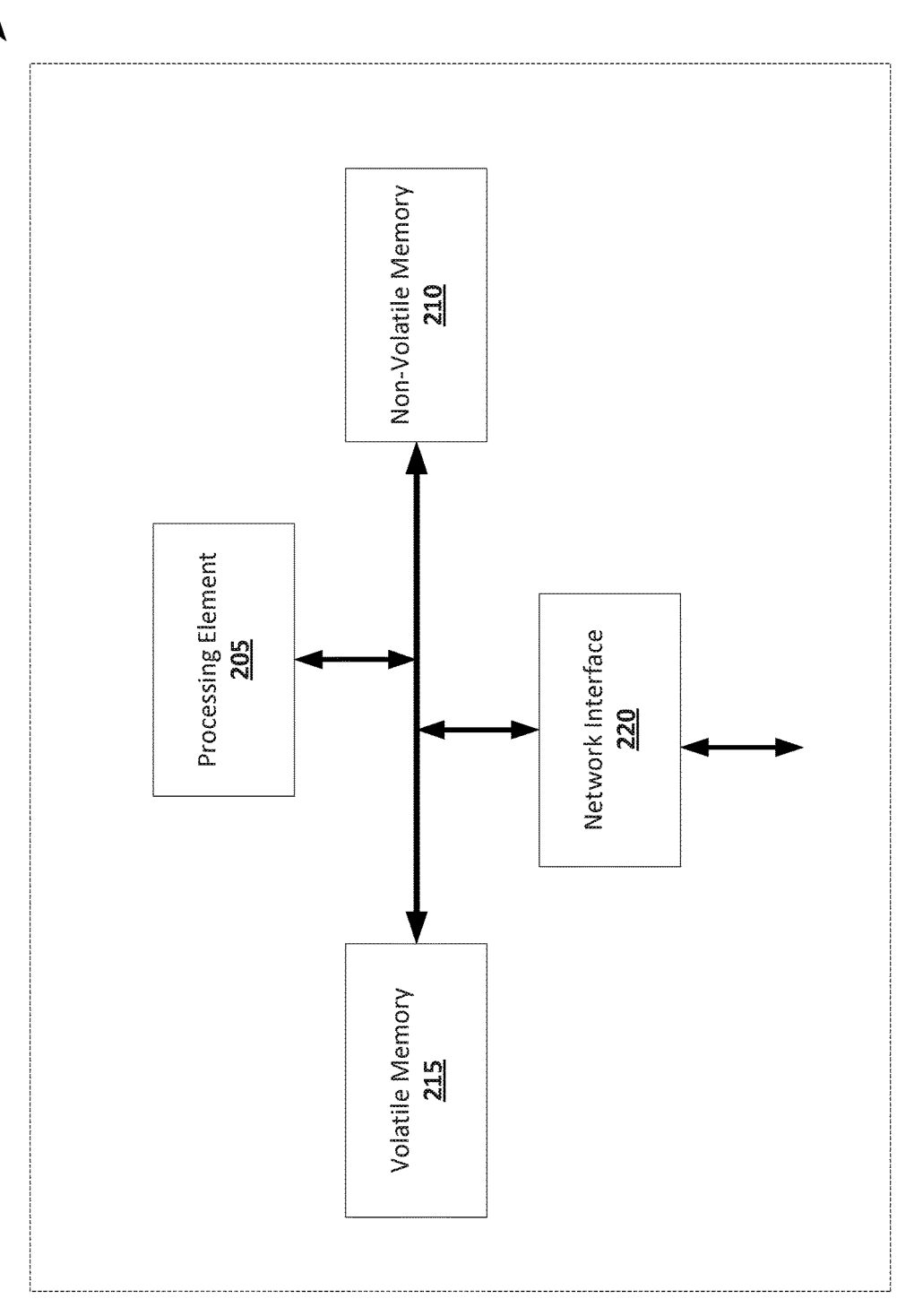
FIG. 2 provides an example predictive document classification computing entity in accordance with some embodiments discussed herein.

FIG. 2 provides a schematic of a predictive document classification computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive document classification computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive document classification computing entity 106 may include, or be in communication with, one or more processing elements 205 (also referred to as processors, processing circuitry, and/or similar terms used herein interchangeably) that communicate with other elements within the predictive document classification computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive document classification computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive document classification computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive document classification computing entity 106 with the assistance of the processing element 205 and operating system.

As indicated, in one embodiment, the predictive document classification computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive document classification computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth® protocols, wireless universal serial bus (USB) protocols, and/or any other wireless protocol.

Although not shown, the predictive document classification computing entity 106 may include, or be in communication with, one or more input elements, such as a keyboard input, a mouse input, a touch screen/display input, motion input, movement input, audio input, pointing device input, joystick input, keypad input, and/or the like. The predictive document classification computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive document classification computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth®, USB, and/or the like. Similarly, the client computing entity 102 may operate in accordance with multiple wired communication standards and protocols, such as those described above with regard to the predictive document classification computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons™, Gimbal proximity beacons, Bluetooth® Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive document classification computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive document classification computing entity 106 and/or various other computing entities.

In another embodiment, the client computing entity 102 may include one or more components or functionalities that are the same or similar to those of the predictive document classification computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo®, Amazon Echo Dot®, Amazon Show®, Google Home®, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention introduce techniques for improving operational reliability and computational efficiency of context-based document classification prediction by using a hierarchical attention-based keyword classifier machine learning framework. As further described herein, a hierarchical attention-based keyword classifier machine learning framework may limit real-time computational operations to those configured to generate a contextual keyword classification for one or more keywords associated with a document page of a document data object, where executing a document classification for the document data object is postponed until after executing one or more contextual keyword classification operations. In this way, by utilizing these techniques, a document classification system can delay execution of some mission-critical operations to after an affirmative contextual keyword classification is determined, thus removing the number of document classification operations that need to be performed. Accordingly, by using a hierarchical attention-based keyword classifier machine learning framework, various embodiments of the present invention reduce the real-time operational load on context-based document classification solutions and thus improves operational reliability and computational efficiency of context-based document classification prediction.

As further described below, various embodiments of the present invention address technical challenges related to efficiently and effectively performing context-based document classification prediction. For example, various embodiments of the present invention disclose techniques for performing context-based document classification operations utilizing a hierarchical attention-based keyword classifier machine learning framework. For example, according to some embodiments of the present invention, context-based document classification using a hierarchical attention-based keyword classifier machine learning framework can be performed by: (i) generating an attention-based keyword encoding for one or more selected keywords identified in a document page of a document data object using an attention-based encoder machine learning model of a hierarchical attention-based keyword classifier machine learning framework; (ii) generating one or more contextual keyword classifications for the one or more selected keywords based at least in part on the attention-based keyword encoding using a keyword classifier machine learning model of the hierarchical attention-based keyword classifier machine learning framework; (iii) determining a document classification based at least in part on the one or more contextual keyword classifications; and (iv) performing one or more prediction-based actions (e.g., appeal urgency prediction) based at least in part on the document classification.

At least one or more of the attention-based encoder machine learning model and keyword classifier machine learning model of the hierarchical attention-based keyword classifier machine learning framework utilizes training data and prediction operations that may, in at least some embodiments, reduce or eliminate the need for computationally expensive training operations in order to generate the respective outputs, which in turn are used to perform prediction-based actions (e.g., appeal urgency prediction). By reducing or eliminating the noted training operations, various embodiments of the present invention: (i) reduce or eliminate the computational operations needed for training and thus improves the computational efficiency of performing context-based document classification prediction, (ii) reduce or eliminate the need for storage resources to train/generate attention-based encoder machine learning model and keyword classifier machine learning model for performing context-based document classification prediction, and thus improves storage efficiency of performing context-based document classification prediction, and (iii) reduce or eliminate the need for transmitting extensive training data needed to generate context-based document classification prediction and thus improves transmission/network efficiency of performing context-based document classification prediction. Via the noted advantages, various embodiments of the present invention make substantial technical contributions to the fields of context-based document classification prediction in particular, and healthcare-related context-based document classification prediction in general.

FIG. 4 provides a flowchart diagram of an example process for document classification prediction of a document data object, according to one or more embodiments of the present disclosure. Via the various steps/operations of the process 400, a predictive document classification computing entity 106 can utilize context keywords associated with identified keywords from a document data object to effectively and efficiently generate one or more contextual keyword classifications using an attention-based keyword classifier machine learning framework and determine a document classification for the document data object based at least in part on the one or more contextual keyword classifications.

The process 400 that is depicted in FIG. 4 begins at step/operation 401 when the predictive document classification computing entity 106 identifies one or more keywords in a document data object comprising text data items (e.g., structured text data, unstructured text data, and/or semi-structured text data), image data items, and/or the like, where a document data object may comprise text data as a plurality of words. The predictive document classification computing entity 106 may be configured to extract one or more of the identified keywords to determine a document classification for the document data object associated with the extracted keywords.

In various embodiments, a document data object may comprise one or more document pages comprising the plurality of words of the document data object. For example, in various embodiments, a document data object comprises one or more document pages comprising a plurality of words across the one or more document pages. For example, a document data object may comprise a plurality of words across n pages (where n=1, 5, 5000, and the like). In some embodiments, one or more document pages of the document data object may comprise the plurality of words.

In various embodiments, one or more words of the plurality of words of a document data object may comprise (e.g., may be) a keyword. For example, a document data object may comprise a plurality of keywords. A keyword may describe a word that is deemed important for document classification with respect to a document data object. For example, a keyword may describe a word that is deemed important for classifying a document data object as either associated with an expedited case or not associated with an expedited case (e.g., in an appeal urgency prediction scenario). In some embodiments, a keyword is deemed important for document classification of a particular document data object based at least in part on the classification type associated with the particular document data object of a plurality of classification types. For example, different keywords may be deemed important for document classification based at least in part on the classification type. For example, in an appeal urgency prediction scenario, a classification type may correspond to a healthcare plan type of a plurality of healthcare plan types, where each healthcare plan type may be associated with different keywords that are deemed important for document classification for the corresponding healthcare plan type. In one or more embodiments, a particular keyword may be associated with one classification type or may be associated with a plurality of classification types (e.g., one or more classification types may have one or more common keywords).

In various embodiments, each classification type is associated with a keyword repository that comprise a collection of candidate keywords deemed important for document classification with respect to the classification type. A document data object or a document page of a document data object may comprise a subset of a corresponding keyword repository, where, in various embodiments the predictive document classification computing entity 106 is configured to identify one or more of the keywords in the subset for document classification for the document data object. For example, the predictive document classification computing entity 106 may be configured to identify a plurality of keywords in a document page of a document data object, where the plurality of keywords is a subset of a keyword repository comprising a collection of candidate keywords deemed important for document classification for the document data object based at least in part on the associated classification type. In various embodiments, the predictive document classification computing entity 106 may utilize one or more of a variety of text tokenization methods, operations, functions, and/or techniques to separate and/or extract the keywords present in the document data object. In various embodiments, each keyword of a document data object is associated with a document page of one or more document pages of the corresponding document data object. For example, one or more document pages of a document data object may comprise one or more keywords of the plurality of keywords of the document data object. In some embodiments, the predictive document classification computing entity 106 may be configured to first identify document pages of a given document data object that comprise keywords in the corresponding keyword repository prior to identifying/extracting one or more keywords from one or more of the identified document pages.

In various embodiments, one or more document pages of a document data object may correspond to an exclusionary page template of a plurality of exclusionary page templates, where an exclusionary page template is a standard document page template that is known to be associated with a negative document classification based at least in part on historical data/information, although the standard document page template may comprise one or more keywords. For example, in an appeal urgency prediction scenario, an exclusionary page template may describe a standard healthcare form/template that comprises one or more keywords but is known to be associated with a non-urgent/non-expedited classification based at least in part on historical data/information.

At step/operation 402, in various embodiments, the predictive document classification computing entity 106 identifies a keyword sequence associated with the plurality of keywords identified in the document data object. A keyword sequence describes a sequence/ordering of keywords present in one or more document pages of a document data object. In some embodiments, a keyword sequence may describe a sequence/ordering of each identified keyword in each document page of a document data object or a subset of the identified keywords. For example, in some embodiments, a keyword sequence may describe a sequence/ordering of keywords present in a particular document page of the document data object, where a plurality of keyword sequences may be identified based at least in part on the output of document classification operations discussed herein utilizing keywords of a particular keyword sequence. For example, in some embodiments, a first keyword sequence associated with a first document page of the document data object is identified and based at least in part on the output of document classification operations discussed herein utilizing the keywords from the first keyword sequence, a second keyword sequence from a second particular document page of the document data object may be identified and utilized in performing document classification operations discussed herein.

In various embodiments, each keyword of the plurality of keywords in a keyword sequence is associated with an order value that describes the order in which the keyword appears in the corresponding document page or document data object. For example, consider a particular document page of a document data object that includes the phrase, "Pt takes care of his wife with early Alzheimer D. Pt's daughter, 64, with late stage of pancreas cancer in N. Jersey," and consider that "care," "Alzheimer," and "cancer" are keywords. In the noted example, a keyword sequence may comprise {care, Alzheimer, cancer}, where care has a lower order value (e.g., 1) relative to Alzheimer and cancer, and Alzheimer has a lower order value (e.g., 2) relative to cancer.

At step/operation 403, the predictive document classification computing entity 106 determines a document classification for the document data object based at least in part on one or more of the keywords identified in the document data object. In some embodiments, to determine the document classification based at least in part on the one or more identified keywords, the predictive document classification computing entity 106 performs a required number of contextual keyword classification routine iterations, where each contextual keyword classification routine iteration is associated with a particular identified keyword in the document data object. For example, in some embodiments, each contextual keyword classification routine iteration is performed utilizing a particular keyword of the one or more identified keywords. In some embodiments, the predictive document classification computing entity 106 performs the required number of contextual keyword classification routine iterations per document page that comprise at least one keyword (e.g., document page identified as comprising one or more keywords). For example, the predictive document classification computing entity 106 may be configured to first utilize keywords from a first document page of the document data object to perform contextual keyword classification routine iterations and based at least in part on the output of the performed contextual keyword classification routine iterations associated with the first document page, the predictive document classification computing entity 106 may utilize keywords from a second document page of the document data object to perform contextual keyword classification routine iterations (e.g., if determined to be required), and based at least in part on the output of the performed contextual keyword classification routine iterations associated with the second document page utilizing keywords from the second document page of the document data object, the predictive document classification computing entity 106 may utilize keywords from other document pages of the document data object to perform contextual keyword classification routine iterations (e.g., if determined to be required).

A contextual keyword classification routine iteration may describe a computer-implemented process that is configured to generate, utilizing an attention-based keyword classifier machine learning framework, a document classification for a document data object based at least in part on a selected keyword from a plurality of keywords in the document data object, where in some embodiments, the selected keyword may be a sequentially-selected keyword in a keyword sequence associated with the document data object. As noted above, a required number of contextual keyword classification routine iterations may be performed in order to determine the document classification for a document data object, where a required number of contextual keyword classification routine iterations may describe a number of iterations of a contextual keyword classification routine iteration performed with respect to a given document data object, where the number of contextual keyword classification routine iterations performed may be based at least in part on a greedy matching indicator. For example, in one or more embodiments, one or more contextual keyword classification routine iterations may be performed utilizing a sequentially-selected keyword for each iteration until a first affirmative contextual keyword classification is determined or until each keyword identified in the document data object is utilized at least once in performing a contextual keyword classification routine iteration. In some embodiments, the attention-based keyword classifier machine learning framework comprises: (i) an attention-based encoder machine learning model configured to generate attention-based keyword encoding of a selected keyword and (ii) a keyword classifier machine learning model configured to generate a contextual keyword classification for the selected keyword based at least in part on the attention-based keyword encoding for the selected keyword.

Figure 5:
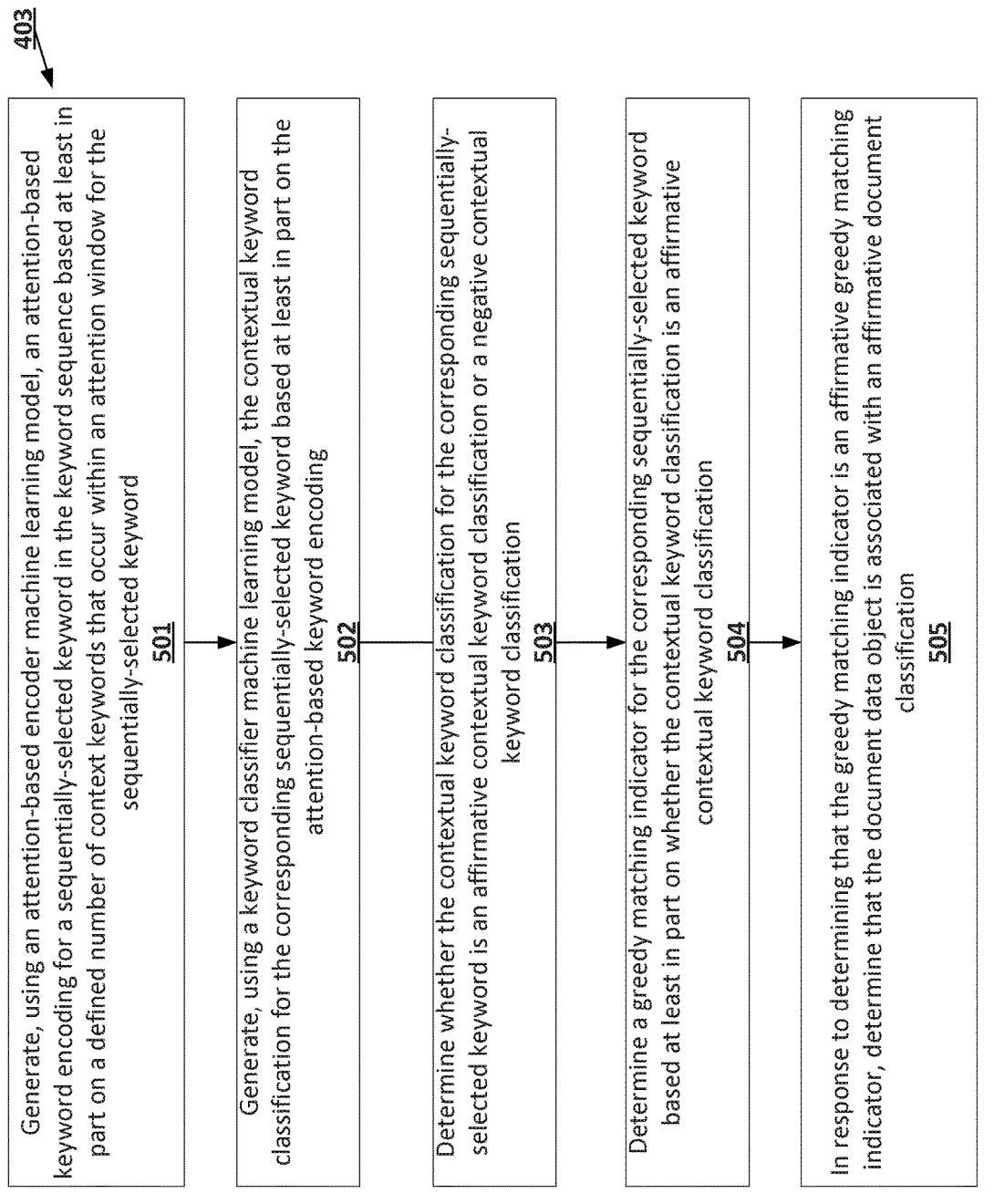
FIG. 5 is a flowchart diagram of an example process for performing a contextual keyword classification routine iteration in accordance with some embodiments discussed herein.

In some embodiments, the step/operation 403 may be performed in accordance with the process depicted in FIG. 5, which is an example process for performing a contextual keyword classification routine iteration. The process that is depicted in FIG. 5 begins at step/operation 501 when the predictive document classification computing entity 106 selects a keyword from identified keywords in a document page of a document data object and generates, using an attention-based encoder machine learning model, an attention-based keyword encoding for the selected keyword based at least in part on a defined number of context keywords that occur within an attention window for the selected keyword. As noted above, the selected keyword may be a sequentially-selected keyword in a keyword sequence associated with the document page. For example, in some embodiments, each contextual keyword classification routine iteration is associated with a sequentially-selected keyword in a keyword sequence (e.g., identified in step/operation 402) associated with the corresponding document data object, where each sequentially-selected keyword is selected and utilized in performing a contextual keyword classification routine iteration in an order based at least in part on the order value of the keyword in the keyword sequence.

In some embodiments, the sequentially-selected keyword may be selected in an ascending order, descending order, and/or the like. For example, in some embodiments, the sequential selection of keywords may be based at least in part on an ascending order, where the predictive document classification computing entity 106 may be configured to select the keyword associated with the lowest order value (e.g., 1) first and select keywords for subsequent iterations (where required) in an ascending order. As another example, in some embodiments, the sequential selection of keywords may be based at least in part on a descending order, where the predictive document classification computing entity 106 may be configured to select the keyword associated with the highest order value (e.g., 20, 40, 200, and the like) first and select keywords for subsequent iterations (where required) in a descending order. In some embodiments, the predictive document classification computing entity 106 may be configured to select keywords for performing each iteration of the required number of contextual keyword classification routine iterations in a random manner, predefined pattern, and/or the like.

An attention window may describe a defined number of words before and/or after a given selected keyword. For example, an attention window may describe three words before the particular selected keyword and three words after the particular selected keyword, where one or more of the three words before the particular selected keyword and the three words after the particular selected keyword may comprise context keywords. As another example, an attention window may describe six words after the particular selected keyword, where one or more of the six words after the particular selected keyword may comprise context keywords. As yet another example, an attention window may describe five words before the particular selected keyword, where one or more of the five words before the particular selected keyword may comprise context keywords. As a further example, an attention window may describe three words before the particular selected keyword and four words after the particular selected keyword, where one or more of the three words before the particular selected keyword and the four words after the particular selected keyword may comprise context keywords.

In some embodiments, the size of the attention window is configurable. In some embodiments, the size of the attention window is adjustable and/or dynamic. For example, in some embodiments the size of the attention window may be modified based at least in part on the output of one or more operations of the contextual keyword classification routine iterations. For example, in some embodiments, the size of the attention window may be modified based at least in part on the output of the attention-based encoder machine learning model or the output of the keyword classifier machine learning model. For example, in some embodiments, the predictive document classification computing entity 106 may be configured to increase or decrease the size of the attention window if it is determined that for each iteration and/or where all identified keywords have been utilized at least once for performing an iteration of the contextual keyword classification routine iterations no affirmative document classification was determined. As noted above, in some embodiments, an affirmative document classification describes an urgent/expedited classification.

In various embodiments, the predictive document classification computing entity 106 is configured to identify context keywords from the plurality of words that occur in the attention window for the selected keyword. In various embodiments, the context keywords may be identified based at least in part on a collection of context keywords in the keyword repository for the classification type associated with the corresponding document data object for the selected keyword, where the context keywords in the keyword repository are deemed important for context-based document classification for the corresponding classification type. For example, the identified context keywords for the selected keyword may be a subset of context keywords in the keyword repository. In various embodiments, the predictive document classification computing entity 106 may utilize one or more of a variety of text tokenization methods, operations, functions, and/or techniques to separate and/or extract the context keywords.

In some embodiments, to generate, using an attention-based encoder machine learning model, an attention-based keyword encoding for the selected keyword (e.g., sequentially-selected keyword), the predictive document classification computing entity 106 provides the identified context keywords associated with the selected keyword as input to the attention-based encoder machine learning model, which are evaluated contextually by the attention-based encoder machine learning model with respect to the selected keyword to determine and generate attention weights for each context keyword, which are in turn used to determine and generate an attention-based keyword encoding for the selected keyword. In various embodiments the attention-based keyword encoding is a vector. For example, in various embodiments the attention-based keyword encoding is a continuous vector representation of the corresponding selected keyword comprising attention information of the context keywords associated with the selected keyword.

In some embodiments, the attention-based encoder machine learning model may be configured to perform operations corresponding to a bidirectional self-attention mechanism. In some embodiments, the attention-based encoder machine learning model may generate embeddings for the keyword and each context keyword identified for the keyword. For example, each embedding may comprise (e.g., summarize) information occurring both before and after (e.g., in a bidirectional manner) each corresponding context keyword and keyword, thereby incorporating contextual information. The embeddings may be processed and/or evaluated by a self-attention mechanism associated with the attention-based encoder machine learning model to generate the attention weights for each embedded context keyword using a set of weight matrices. The embeddings and the associated attention weights may be inputs to and processed by one or more layers of the attention-based encoder machine learning model. In some embodiments, the attention-based encoder machine learning model may utilize a multi-head self-attention mechanism comprising N (e.g., N=8) attention heads, where each attention head is configured to generate a per-head set of weight matrices that is configured to be used in generating the attention-based keyword encoding. In some embodiments, the attention-based keyword encoding may be represented as a continuous vector that incorporates the attention weights for the context keywords.

Figure 6:
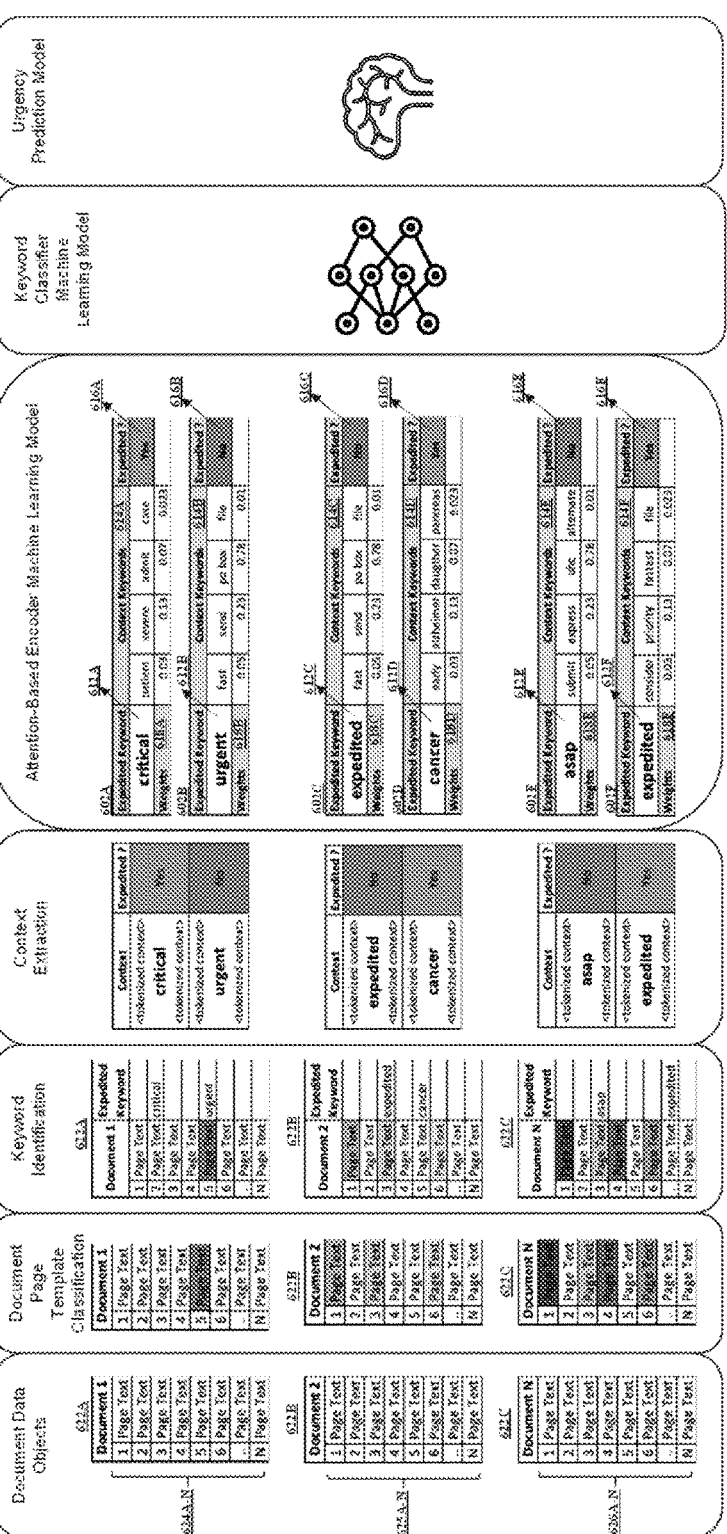
FIG. 6 provides an operation example for training machine learning models of an attention-based keyword classifier machine learning framework in accordance with some embodiments discussed herein.

In various embodiments, the attention-based encoder machine learning model is a trained supervised machine learning model, where the training dataset comprise training features along with a ground-truth label (e.g., urgent/expediated classification or non-urgent/non-expediated classification). FIG. 6 provides an operational example 600 for training the models of an attention-based keyword classifier machine learning framework comprising an attention-based encoder machine learning model and a keyword classifier machine learning model. In some embodiments, the attention-based encoder machine learning model may be trained based at least in part on a plurality of identified keywords from a plurality of training document data objects and context keywords for each identified keyword of the plurality of identified keywords extracted from the plurality of training document data objects. In various embodiments, the training document data objects comprises: (i) a plurality of training document pages that correspond to at least one exclusionary page template and/or that are known to be associated with a negative document classification and (ii) a plurality of training document pages that do not correspond to any exclusionary page template and/or that are known to be associated with an affirmative document classification. As shown in FIG. 6, in example embodiments, the training dataset for training the attention-based encoder machine learning model may comprise a plurality of training data fields (e.g., 602A-F), where each training data field comprises: (i) an identified keyword (e.g., 612A-F) from a training document page (e.g., 624A-N, 625A-N, and 626A-N) of a training document data object (e.g., 622A-C); (ii) extracted context keywords (e.g., 614A-F) associated with the identified keyword; and (iii) ground-truth label (616A-F), where the ground-truth label describes whether the corresponding identified keyword is associated with an affirmative document classification or a negative document classification. In some embodiments, an affirmative document classification may describe an urgent/expedited classification, and a negative document classification may describe a non-urgent/non-expedited classification. An identified keyword that is extracted from a training document page that corresponds to at least one exclusionary page template of a plurality of exclusionary page templates is labeled as a negative document classification (e.g., non-urgent/non-expedited classification). A keyword that is extracted from a training document page that corresponds to a non-exclusionary page template is labeled as an affirmative document classification (e.g., urgent/expedited classification). In various embodiments, the training dataset comprising the plurality of training data fields is provided as input to the attention-based encoder machine learning model to train the attention-based encoder machine learning model. As shown in FIG. 6, for each identified keyword in the training dataset, the attention-based encoder machine learning model generates and assigns an attention weight (e.g., 618A-F) for each context keyword associated with the identified keyword. In various embodiments the output during training of the attention-based encoder machine learning model is a vector representation of each keyword based at least in part on the attention weight for each context keyword. In various embodiments the output is provided as input to the keyword classifier machine learning model to train the keyword machine learning model.

Returning to FIG. 5, at step/operation 502, the predictive document classification computing entity 106 generates, using the keyword classifier machine learning model of the attention-based keyword classifier machine learning framework, the contextual keyword classification for the corresponding selected keyword (e.g., sequentially-selected keyword) based at least in part on the attention-based keyword encoding generated by the attention-based encoder machine learning model of the attention-based keyword classifier machine learning framework. In various embodiments, the predictive document classification computing entity 106 provides as input to the keyword classifier machine learning model, the attention-based keyword encoding for the selected keyword (e.g., sequentially-selected keyword) and the keyword classifier machine learning model provides as output a contextual keyword classification for the corresponding selected keyword. In various embodiments the output of the keyword classifier machine learning model comprises a vector representation, where the vector representation may comprise a confidence level value (e.g., confidence score) with respect to classification of the corresponding selected keyword as an affirmative contextual keyword classification (e.g., urgent/expedited classification) and/or (ii) a confidence level value (e.g., confidence score) with respect to classification of the corresponding selected keyword as a negative contextual keyword classification (e.g., non-urgent/non-expedited classification).

In various embodiments, the keyword classifier machine learning model is a trained machine learning model (e.g., artificial neural network machine learning model, or the like). As shown in FIG. 6, in various embodiments, the keyword classifier machine learning model is trained based at least in part on the output of the attention-based encoder machine learning model generated during training thereof. In various embodiments the output of the attention-based encoder machine learning model during training thereof is provided to the keyword classifier machine learning model for training along with the ground-truth label (e.g., urgent/expedited classification or non-urgent/non-expedited classification) for each corresponding keyword.

Figure 7:
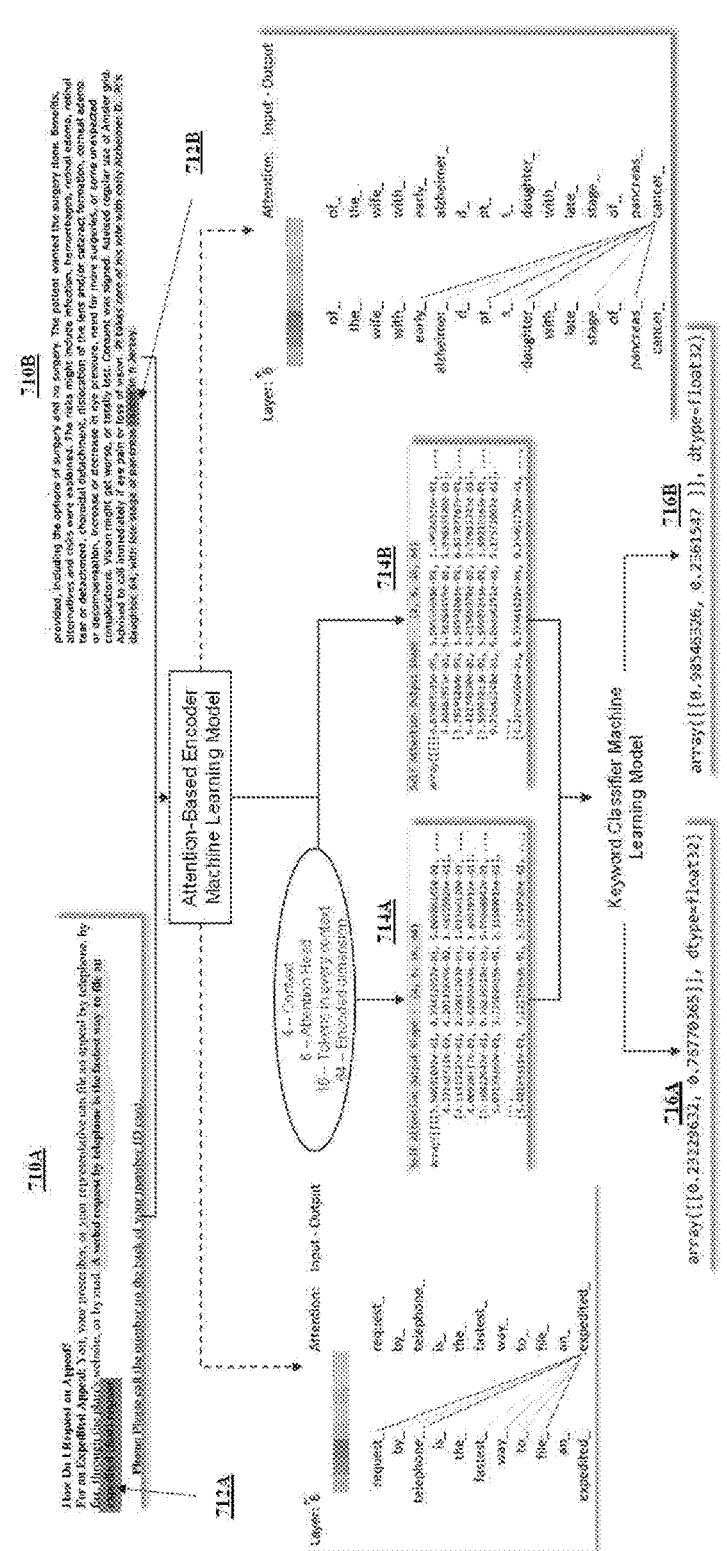
FIG. 7 provides an operational example for generating contextual keyword classification using an attention-based keyword classifier machine learning framework in accordance with some embodiments discussed herein.

FIG. 7 provides an operational example 700 for generating contextual keyword classification using the attention-based keyword classifier machine learning framework. As shown in FIG. 7, for each document page 710A and 710B, the predictive document classification computing entity 106 processes and/or evaluates, utilizing the attention-based encoder machine learning model, the corresponding keywords 712A and 712B in relation to extracted context keywords for each keyword 712A and 712B and generates attention-based keyword encodings 714A and 714B for each keyword 712A and 712B respectively, which are provided to the keyword classifier machine learning model as input. As shown in FIG. 7, the predictive document classification computing entity 106, utilizing the keyword classifier machine learning model, processes and/or evaluates the attention-based keyword encodings 714A and 714B, and generates as output for each keyword 712A and 712B, a corresponding contextual keyword classification. As noted above and illustrated in FIG. 7, in some embodiments, the output of the keyword classifier machine learning model may comprise a vector representation (e.g., 716A and 716B), where the vector representation may comprise a confidence level value (e.g., confidence score) with respect to classification of the corresponding selected keyword (e.g., sequentially-selected keyword) as an affirmative contextual keyword classification (e.g., urgent/expedited classification) and/or (ii) a confidence level value (e.g., confidence score) with respect to classification of the corresponding selected keyword (e.g., sequentially-selected keyword) as a negative contextual keyword classification (e.g., non-urgent/non-expediated classification). For example, as shown in FIG. 7, the vector representation [0.23229632, 0.76770365] for keyword 712A describes that the confidence level that the contextual keyword classification is an affirmative contextual keyword classification is about 23.22 percent and the confidence level that the contextual keyword classification for keyword 712A is a negative contextual keyword is about 76.77 percent. As another example, as shown in FIG. 7, the vector representation [0.9854632, 0.2361547] for keyword 712B describes that the confidence level that the contextual keyword classification for keyword 712B is an affirmative contextual keyword classification is about 98.54 percent and the confidence level that the contextual keyword classification for keyword 712B is a negative contextual keyword classification is about 23.61 percent.

Returning to FIG. 5, at step/operation 503, the predictive document classification computing entity 106 determines whether the contextual keyword classification for the corresponding selected keyword (e.g., sequentially-selected keyword) is an affirmative contextual keyword classification or a negative contextual keyword classification. In various embodiments, in response to determining that the contextual keyword classification for the corresponding sequentially-selected keyword is a negative contextual keyword classification, the predictive document classification computing entity 106, selects another keyword from the plurality of keywords of the document data object and performs another contextual keyword classification routine iteration utilizing the newly selected keyword, where the newly selected keyword may be sequentially selected. As an example, the newly selected keyword may be associated with the same document page as the former selected keyword. For example, the newly selected keyword may be sequentially selected from the keyword sequence associated with the former selected keyword. As another example, the newly selected keyword may be associated with a different document page relative to the former selected keyword. For example, in some embodiments, the predictive document classification computing entity 106 may be configured to select the newly selected keyword (e.g., sequentially) from a different document page if it is determined that each keyword in the document page associated with the former selected keyword has been utilized in performing a contextual keyword classification routine iteration.

Returning to FIG. 5, at step/operation 504, the predictive document classification computing entity 106 determines a greedy matching indicator for the selected keyword (e.g., sequentially-selected keyword) based at least in part on whether the contextual keyword classification for the selected keyword is an affirmative contextual keyword classification. For example, in various embodiments, in response to determining that the contextual keyword classification for the corresponding sequentially-selected keyword is an affirmative keyword classification, the predictive document classification computing entity 106 determines a greedy matching indicator, where a greedy matching indicator describes a data entity that is configured to at least in part determine when to terminate the required number of contextual keyword classification routine iterations. In various embodiments, the step/operation 504 may be performed in accordance with the process that is depicted in FIG. 8, which is an example process for determining a greedy matching indicator with respect to a selected keyword that is associated with an affirmative contextual keyword classification.

The process that is depicted in FIG. 8 begins at step/operation 801 when the predictive document classification computing entity 106 identifies a document page associated with the selected keyword (e.g., sequentially-selected keyword). At step/operation 802, the predictive document classification computing entity 106 generates a page template for the document page. In various embodiments, the predictive document classification computing entity 106 generates the page template for a given document page based at least in part on a page name for the document page and a keyword set for the document page (e.g., keywords present in the document page).

At step/operation 803, the predictive document classification computing entity 106 determines whether the page template corresponds to at least one of a plurality of exclusionary page templates. The plurality of exclusionary page templates may be generated based at least in part on a training dataset that comprise a plurality of excluded training document pages, where an excluded training document page describes a document page that is known to be associated with a negative document classification (e.g., non-urgent/non-expedited classification), and where the excluded training document page may comprise one or more keywords. For example, in an appeal urgency prediction scenario, an excluded training document page may describe a standard template that comprises one or more keywords, but the excluded training document page (e.g., the noted standard template) is known to be associated with a non-urgent/non-expedited classification.

Figure 9:
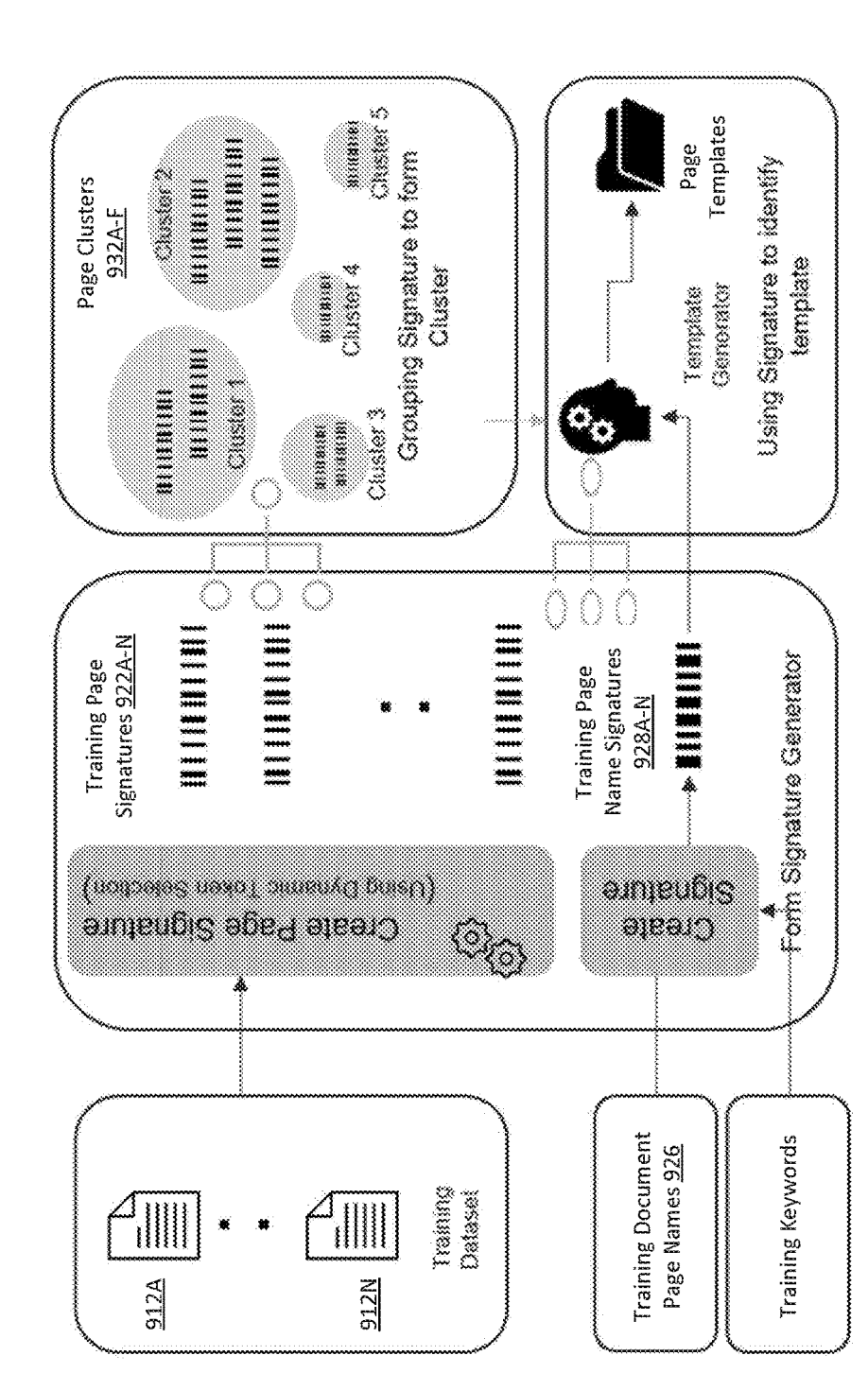
FIG. 9 provides an operational example for generating exclusionary page templates in accordance with some embodiments discussed herein.

FIG. 9 provides an operational example 900 for generating exclusionary page templates. As shown in FIG. 9, the predictive document classification computing entity 106 identifies a plurality of excluded training document pages (e.g., 912A-N) and a plurality of unique excluded training document page names 926, where a unique excluded training document page name describes a document page name of a document page that is known to be associated with a negative document classification. As shown in FIG. 9, for each excluded training document page, the predictive document classification computing entity 106, (e.g., utilizing a template signature generator), generates a training page signature (e.g., 922A-N). One or more of a variety of techniques (e.g., dynamic token selection) may be utilized to generate the training page signatures.

As further shown in FIG. 9, for each unique excluded training document page name, the predictive document classification computing entity 106 (e.g., utilizing a form signature generator) generates a training page name signature (e.g., 928A-N). In some embodiments the training page name signatures are generated based at least at least in part on one or more training keywords. As shown in FIG. 9, (i) one or more excluded training document page clusters (e.g., 932A-F) are generated based at least in part on each training page signature (e.g., similarity of training page signatures), where each excluded training document page cluster comprises a clustered document page subset of the plurality of excluded training document pages, and (ii) for each excluded training document page cluster, an exclusionary page template is generated based at least in part on each training page signature for the clustered document page subset. In some embodiments, to generate a particular exclusionary page template that is associated with a particular excluded training document page cluster, the predictive document classification computing entity 106, (e.g., utilizing a template generator) generates the particular exclusionary page template based at least in part on a training page signature distribution for the clustered document page subset (e.g., distribution of each training page signature associated with the clustered document page subset) of the particular exclusionary page template. In some embodiments, generating the particular exclusionary page template is performed based at least in part on a page name distribution for the clustered document page subset of the particular exclusionary page template and a keyword distribution for the particular exclusionary page template.

In some embodiments, a given unique excluded training document page name may be associated with a plurality of training page signatures (e.g., different types of training page signatures). In the noted embodiments, the predictive document classification computing entity 106, (e.g., utilizing a template generator), may be configured to generate a single exclusionary page template for the given unique excluded training document page name based at least in part on each of the plurality of training page signatures, such that the generated single exclusionary page template incorporates each of the plurality of training page signatures associated with the unique excluded training document page name and may be utilized to identify document pages with a page signature that corresponds to a given training page signature of the noted plurality of training page signatures.

Returning to FIG. 8, at step/operation 804, in response to determining that the page template does not correspond to any of the plurality of exclusionary page templates, the predictive document classification computing entity 106 determines an affirmative greedy matching indicator. In some embodiments, in response to determining that the page template corresponds to at least one of the plurality of exclusionary page templates, the predictive document classification computing entity 106 determines a negative greedy matching indicator.

Returning to FIG. 5 at step/operation 505, in response to determining that the greedy matching indicator is an affirmative greedy matching indicator, the predictive document classification computing entity 106 determines that the document data object is associated with an affirmative document classification. Additionally, in various embodiments, in response to determining that the greedy matching indicator is an affirmative greedy matching indicator, the predictive document classification computing entity 106 terminates the required number of contextual keyword classification routines (e.g., no further contextual keyword classification routine iteration is required). In various embodiments, in response to determining that the greedy matching indicator is a negative greedy matching indicator, the predictive document classification computing entity 106 may be configured to determine document classification for the associated document data object utilizing a different keyword identified in the document data object (e.g., perform a contextual keyword classification routine iteration using a newly selected keyword).

Returning to FIG. 4 at step/operation 404, the predictive document classification computing entity 106 performs one or more prediction-based actions based at least in part on the document classification. Examples of prediction-based actions that may be performed based at least in part on the document classification includes automatically generating a notification, where for example, in an appeal urgency prediction scenario, the notification may comprise data/information reflecting appeal cases accurately classified as expediated/urgent and requiring expediated attention and/or appeal cases accurately classified as non-expediated/non-urgent and thus not requiring expediated attention, automatically generating an alert indicating that a particular appeal case requires immediate attention, and/or the like.

Figure 10:
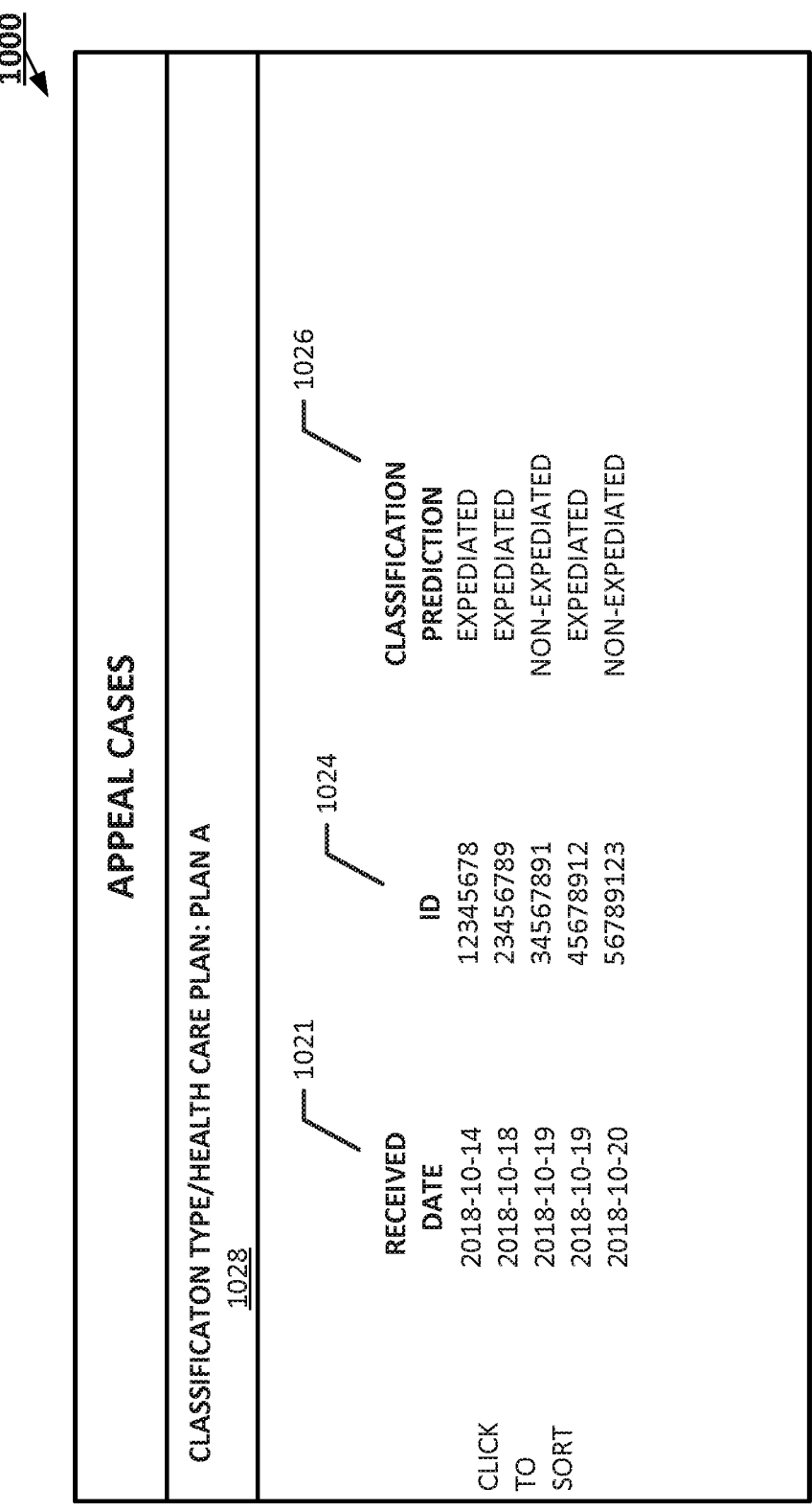
FIG. 10 provides an operational example of a prediction output user interface depicting classification prediction in accordance with some embodiments discussed herein.

In some embodiments, the one or more prediction-based actions comprises generating (e.g., causing a client computing entity 102 to display, via transmitting user interface data to the client computing entity 102) a prediction output user interface that describes the document classification predictions (and thus the corresponding appeal urgency prediction) for one or more appeal cases. An operational example of such a prediction output user interface 1000 is depicted in FIG. 10. As depicted in FIG. 10, the prediction output user interface 1000 describes the corresponding appeal urgency prediction corresponding to the document classification prediction. As shown in FIG. 10, in some embodiments, the prediction output user interface 1000 may describe the classification type 1028 along with the predictions 1026 (e.g., urgency prediction), unique identifications 1024, and received dates 1021.

Moreover, various embodiments of the present invention introduce techniques for improving operational reliability and computational efficiency of context-based document classification by using a hierarchical attention-based keyword classifier machine learning framework. As further described herein, a hierarchical attention-based keyword classifier machine learning framework may limit real-time computational operations to those configured to generate a contextual keyword classification for one or more keywords associated with a document page of a document data object, where executing a document classification for the document data object is postponed until after executing one or more contextual keyword classification operations. In this way, by utilizing these techniques a document classification system can delay execution of some mission-critical operations to after an affirmative contextual keyword classification is determined, thus removing the number of document classification operations that need to be performed. Accordingly, by using a hierarchical attention-based keyword classifier machine learning framework, various embodiments of the present invention reduce the real-time operational load on context-based document classification solutions and thus improves operational reliability and computational efficiency of context-based document classification solutions.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

identifying, by one or more processors, a keyword sequence associated with a plurality of keywords, wherein the plurality of keywords is a subset of a keyword repository comprising a group of candidate keywords;

performing, by the one or more processors, a plurality of contextual keyword classification routine iterations, wherein: (i) a contextual keyword classification routine iteration of the plurality of contextual keyword classification routine iterations is associated with a corresponding sequentially-selected keyword in the keyword sequence, and (ii) the contextual keyword classification routine iteration is configured to:

generate, using an attention-based keyword classifier machine learning framework and based at least in part on the corresponding sequentially-selected keyword, a contextual keyword classification, determine a greedy matching indicator for the corresponding sequentially-selected keyword based at least in part on whether the contextual keyword classification for the corresponding sequentially-selected keyword is an affirmative contextual keyword classification by:

(1) identifying a document page associated with the corresponding sequentially-selected keyword, (2) generating a page template for the document page, and (3) in response to determining that the page template corresponds to at least one of a plurality of exclusionary page templates, determining a negative greedy matching indicator, and in response to determining that the greedy matching indicator is an affirmative greedy matching indicator:

(a) determine that a document data object is associated with an affirmative document classification, and (b) terminate the plurality of contextual keyword classification routine iterations; and initiating, by the one or more processors, performance of one or more prediction-based actions based at least in part on the affirmative document classification.

2. The computer-implemented method of claim 1, wherein determining the plurality of exclusionary page templates comprises:

identifying a plurality of excluded training document pages;

generating a plurality of training page signatures corresponding to the plurality of excluded training document pages;

generating, based at least in part on the plurality of training page signatures, an excluded training document page cluster comprising a clustered document page subset of the plurality of excluded training document pages; and generating an exclusionary page template for the excluded training document page cluster based at least in part on, training page signature, of the plurality of training page signatures, for the clustered document page subset.

3. The computer-implemented method of claim 2, wherein generating a particular exclusionary page template that is associated with a particular excluded training document page cluster comprises:

generating the particular exclusionary page template based at least in part on a training page signature distribution for the clustered document page subset of the particular exclusionary page template.

4. The computer-implemented method of claim 3, wherein generating the particular exclusionary page template is performed based at least in part on a page name distribution for the clustered document page subset of the particular exclusionary page template and a keyword distribution for the particular exclusionary page template.

5. The computer-implemented method of claim 4, wherein the page template for the document page is determined based at least in part on a page name for the document page and a keyword set for the document page.

6. The computer-implemented method of claim 1, wherein: (a) the attention-based keyword classifier machine learning framework comprises an attention-based encoder machine learning model and a keyword classifier machine learning model, (b) the attention-based encoder machine learning model is configured to generate an attention-based keyword encoding for the corresponding sequentially-selected keyword based at least in part on a defined number of context keywords of the keyword repository that occur within an attention window for the corresponding sequentially-selected keyword, and (c) the keyword classifier machine learning model is configured to generate the contextual keyword classification for the corresponding sequentially-selected keyword based at least in part on the attention-based keyword encoding.

7. The computer-implemented method of claim 6, wherein the attention-based encoder machine learning model is configured to perform operations corresponding to a bidirectional self-attention mechanism.

8. A system comprising:

one or more processors; and at least one memory storing processor-executable instructions that, when executed by the one or more processors, cause the one or more processors to:

identify a keyword sequence associated with a plurality of keywords, wherein the plurality of keywords is a subset of a keyword repository comprising a group of candidate keywords;

perform a plurality of contextual keyword classification routine iterations, wherein: (i) a contextual keyword classification routine iteration of the plurality of contextual keyword classification routine iterations is associated with a corresponding sequentially-selected keyword in the keyword sequence, and (ii) the contextual keyword classification routine iteration is configured to:

generate, using an attention-based keyword classifier machine learning framework and based at least in part on the corresponding sequentially-selected keyword, a contextual keyword classification, determine a greedy matching indicator for the corresponding sequentially-selected keyword based at least in part on whether the contextual keyword classification for the corresponding sequentially-selected keyword is an affirmative contextual keyword classification by:

(1) identifying a document page associated with the corresponding sequentially-selected keyword, (2) generating a page template for the document page, and (3) in response to determining that the page template corresponds to at least one of a plurality of exclusionary page templates, determining a negative greedy matching indicator, and in response to determining that the greedy matching indicator is an affirmative greedy matching indicator:

(a) determine that a document data object is associated with an affirmative document classification, and (b) terminate the plurality of contextual keyword classification routine iterations; and initiate performance of one or more prediction-based actions based at least in part on the affirmative document classification.

9. The system of claim 8, wherein determining the plurality of exclusionary page templates comprises:

identifying a plurality of excluded training document pages;

generating a plurality of training page signatures corresponding to the plurality of excluded training document pages;

generating, based at least in part on the plurality of training page signatures, an excluded training document page cluster comprising a clustered document page subset of the plurality of excluded training document pages; and generating an exclusionary page template for the excluded training document page cluster based at least in part on a training page signature, of the plurality of training page signatures, for the clustered document page subset.

10. The system of claim 1, wherein generating a particular exclusionary page template that is associated with a particular excluded training document page cluster comprises:

generating the particular exclusionary page template based at least in part on a training page signature distribution for the clustered document page subset of the particular exclusionary page template.

11. The system of claim 10, wherein generating the particular exclusionary page template is performed based at least in part on a page name distribution for the clustered document page subset of the particular exclusionary page template and a keyword distribution for the particular exclusionary page template.

12. The system of claim 11, wherein the page template for the document page is determined based at least in part on a page name for the document page and a keyword set for the document page.

13. The system of claim 8, wherein: (a) the attention-based keyword classifier machine learning framework comprises an attention-based encoder machine learning model and a keyword classifier machine learning model, (b) the attention-based encoder machine learning model is configured to generate an attention-based keyword encoding for the corresponding sequentially-selected keyword based at least in part on a defined number of context keywords of the keyword repository that occur within an attention window for the corresponding sequentially-selected keyword, and (c) the keyword classifier machine learning model is configured to generate the contextual keyword classification for the corresponding sequentially-selected keyword based at least in part on the attention-based keyword encoding.

14. The system of claim 13, wherein the attention-based encoder machine learning model is configured to perform operations corresponding to a bidirectional self-attention mechanism.

15. One or more non-transitory computer-readable storage media including instructions that, when executed by one or more processors, cause the one or more processors to:
    identify a keyword sequence associated with a plurality of keywords, wherein the plurality of keywords is a subset of a keyword repository comprising a group of candidate keywords;
    perform a plurality of contextual keyword classification routine iterations, wherein: (i) a contextual keyword classification routine iteration of the plurality of contextual keyword classification routine iterations is associated with a corresponding sequentially-selected keyword in the keyword sequence, and (ii) the contextual keyword classification routine iteration is configured to:
        generate, using an attention-based keyword classifier machine learning framework and based at least in part on the corresponding sequentially-selected keyword, a contextual keyword classification,
        determine a greedy matching indicator for the corresponding sequentially-selected keyword based at least in part on whether the contextual keyword classification for the corresponding sequentially-selected keyword is an affirmative contextual keyword classification by:
           (1) identifying a document page associated with the corresponding sequentially-selected keyword,
           (2) generating a page template for the document page, and
           (3) in response to determining that the page template corresponds to at least one of a plurality of exclusionary page templates, determining a negative greedy matching indicator, and
        in response to determining that the greedy matching indicator is an affirmative greedy matching indicator:
           (a) determine that a document data object is associated with an affirmative document classification, and
           (b) terminate the plurality of contextual keyword classification routine iterations; and initiate performance of one or more prediction-based actions based at least in part on the affirmative document classification.

16. The one or more non-transitory computer-readable storage media of claim 15, wherein determining the plurality of exclusionary page templates comprises:
    identifying a plurality of excluded training document pages;
    generating a plurality of training page signatures corresponding to the plurality of excluded training document pages;
    generating, based at least in part on the plurality of training page signatures, an excluded training document page cluster comprising a clustered document page subset of the plurality of excluded training document pages; and
    generating an exclusionary page template for the excluded training document page cluster based at least in part on a training page signature, of the plurality of training page signatures, for the clustered document page subset.

17. The one or more non-transitory computer-readable storage media of claim 16, wherein generating a particular exclusionary page template that is associated with a particular excluded training document page cluster comprises:
    generating the particular exclusionary page template based at least in part on a training page signature distribution for the clustered document page subset of the particular exclusionary page template.

18. The one or more non-transitory computer-readable storage media of claim 17, wherein generating the particular exclusionary page template is performed based at least in part on a page name distribution for the clustered document page subset of the particular exclusionary page template and a keyword distribution for the particular exclusionary page template.

19. The one or more non-transitory computer-readable storage media of claim 18, wherein the page template for the document page is determined based at least in part on a page name for the document page and a keyword set for the document page.

20. The one or more non-transitory computer-readable storage media of claim 15, wherein: (a) the attention-based keyword classifier machine learning framework comprises an attention-based encoder machine learning model and a keyword classifier machine learning model, (b) the attention-based encoder machine learning model is configured to generate an attention-based keyword encoding for the corresponding sequentially-selected keyword based at least in part on a defined number of context keywords of the keyword repository that occur within an attention window for the corresponding sequentially-selected keyword, and (c) the keyword classifier machine learning model is configured to generate the contextual keyword classification for the corresponding sequentially-selected keyword based at least in part on the attention-based keyword encoding.

* * * * *